United States Patent [19]
Yamamoto et al.

[11] Patent Number: 6,017,631
[45] Date of Patent: Jan. 25, 2000

[54] PLATE-LIKE FERRITE PARTICLES WITH MAGNETOPLUMBITE STRUCTURE AND MAGNETIC CARD USING THE SAME

[75] Inventors: Akinori Yamamoto, Hatsukaichi; Kazutoshi Sanada; Shigehisa Yamamoto, both of Hiroshima, all of Japan

[73] Assignee: Toda Kogyo Corporation, Japan

[21] Appl. No.: 09/033,688

[22] Filed: Mar. 3, 1998

[30] Foreign Application Priority Data

Mar. 4, 1997 [JP] Japan .................................. 9-067448

[51] Int. Cl.$^7$ ........................................................ B32B 5/16
[52] U.S. Cl. ........................... 428/402; 428/403; 428/405; 428/407; 428/447; 428/694 GT; 428/697; 428/702; 428/900
[58] Field of Search ...................................... 428/402, 403, 428/405, 407, 447, 694 GT, 697, 702, 900

*Primary Examiner*—Bernard Pianalto
*Attorney, Agent, or Firm*—Nixon & Vanderhye

[57] ABSTRACT

The present invention relates to plate-like ferrite particles with magnetoplumbite structure having a composition represented by the general formula of $AO \cdot n\{(Fe_{1-(a+b)}Bi_aM_b)_2O_3\}$ wherein A is Ba, Sr or Ba—Sr; M is Zn—Nb, Zn—Ta or Zn—Sn; n is from 5.5 to 6.1; a is from 0.001 to 0.005; b is from 0.050 to 0.120; and the ratio of b/a is from 20 to 50. The plate-like ferrite particles with magnetoplumbite structure have an appropriate particle size, a low coercive force, a large saturation magnetization, a small switching field distribution (S.F.D.) and an excellent temperature stability, and a magnetic card containing the plate-like ferrite particles with magnetoplumbite structure.

11 Claims, No Drawings ize magnetic particles having a coercive force of about 1,400 Oe or lower. Further, in order to produce plate-like ferrite particles with magnetoplumbite structure having a coercive force of about 1,400 Oe or lower, metal elements such as Ti, Co, Zn and Sn have been conventionally incorporated therein to reduce the coercive force thereof.

PLATE-LIKE FERRITE PARTICLES WITH MAGNETOPLUMBITE STRUCTURE AND MAGNETIC CARD USING THE SAME

BACKGROUND OF THE INVENTION

The present invention relates to plate-like ferrite particles with magnetoplunibite structure and a magnetic card using the plate-like ferrite particles with magnetoplumbite structure. More particularly, the present invention relates to plate-like ferrite particles with magnetoplumbite structure having an appropriate particle size, a low coercive force, a large saturation magnetization, a small switching field distribution (S.F.D.) and an excellent temperature stability, and a magnetic card containing the plate-like ferrite particles with magnetoplumbite structure.

In recent years, magnetic cards have been widely used in various application fields such as, typically, magnetic stripe-type credit cards, railroad tickets, season tickets, highway passes, telephone cards and prepaid railway cards.

These magnetic cards have been generally produced by a method of directly applying a magnetic coating material obtained by kneading magnetic particles and a binder together, to a card substrate, a method of applying the magnetic coating material to a non-magnetic substrate such as a base film and drying the applied magnetic layer to obtain a magnetic tape, and then attaching the obtained magnetic tape on a card substrate through adhesive, or the like.

Recently, there has been an increasing demand for high-performance magnetic cards. In order to produce such high-performance magnetic cards, it is important to strictly select magnetic particles used therein. That is, the magnetic particles having not only an appropriate particle size, a low coercive force and a large saturation magnetization, but also a switching field distribution as low as possible and an excellent temperature stability, have been strongly required.

The requirements concerning these properties of the magnetic particles are explained below.

The surface properties of a coat of the magnetic cards have a close relationship with the particle size of the magnetic particles. When the particle size is more than 1.50 $\mu m$, the surface properties of the coat are adversely affected. Therefore, magnetic particles having a particle size of usually about 0.30 to about 1.50 $\mu m$, have been conventionally used.

In addition, the coercive force of a magnetic layer of the magnetic card has a close relationship with that of the magnetic particles. As magnetic particles for the magnetic cards, there have been widely used plate-like ferrite particles with magnetoplumbite structure, because these particles can exhibit a coercive force as high as 2,000 to 3,000 Oe and can be readily magnetically oriented upon the preparation of a magnetic coating material.

However, from the standpoint of preventing a forgery or an alteration of magnetic cards, there have been recently used magnetic cards obtained by forming upper and lower magnetic layers whose coercive forces are different from each other, on a non-magnetic substrate.

That is, in Japanese Patent Application Laid-open (KOKAI) No. 4-291021(1992), there is described a magnetic card in which a low-coercive force layer having a coercive force of about not more than 1,400 Oe and a high-coercive force layer having a coercive force of not less than 2,900 Oe, are formed on a substrate.

In order to form such a low-coercive force layer having a coercive force of about 1,400 Oe or lower, it is necessary to use magnetic particles having a coercive force of about 1,400 Oe or lower. Further, in order to produce plate-like ferrite particles with magnetoplumbite structure having a coercive force of about 1,400 Oe or lower, metal elements such as Ti, Co, Zn and Sn have been conventionally incorporated therein to reduce the coercive force thereof.

In addition, when the plate-like ferrite particles with magnetoplumbite structure are used for the magnetic cards, it is necessary that the saturation magnetization thereof is as large as possible. This fact is described, for example, in Japanese Patent Application Laid-open (KOKAI) No. 56-149328(1981) as ". . . it is required that the magnetoplumbite ferrite particles used as a magnetic material for magnetic recording media have as large a saturation magnetization as possible . . .".

Also, in order to improve a reproduction output from the magnetic cards, it is required that the switching field distribution (S.F.D.) is as small as possible.

That is, as described in Japanese Patent Application Laid-open (KOKAI) No. 63-26821(1988), when the relationship between the S.F.D. value of the magnetic recording medium and the reproduction output therefrom is graphed, it is recognized that the reproduction output is linearly increased as the S.F.D. value is decreased. This indicates that the use of magnetic particles having a small S.F.D. value results in increase in the reproduction output.

Further, there has been an endless demand for improvement of the properties of the ferrite particles with magnetoplumbite structure when applied to magnetic cards. For instance, it has been strongly required that the plate-like ferrite particles with magnetoplumbite structure have an excellent temperature stability.

However, as is apparent, for example, from FIG. 4 on page 1123 of "IEEE TRANSACTIONS ON MAGNETICS", MAG-18, NO. 6, it has been conventionally pointed out that the plate-like ferrite particles with magnetoplumbite structure have such a problem that the coercive force thereof is increased with the elevating in temperature, thereby causing deterioration in magnetic stability (especially, a stability of coercive force) with respect to temperature (hereinafter referred to merely as "temperature stability").

The magnetic recording on the magnetic card is performed by magnetizing the magnetic particles contained in the magnetic card in a magnetic field produced by a magnetic head thereon. In the case where magnetic particles having a deteriorated temperature stability are used in the magnetic card, even though the magnetic field produced by the magnetic head is so adjusted as to impart an optimum coercive force to the magnetic particles at room temperature, optimum recording on the magnetic card cannot be necessarily achieved when the coercive force of the magnetic particles is fluctuated due to the elevating in temperature caused by the change in environmental conditions.

Hitherto, as the ferrite particles with magnetoplumbite structure which show a small coercive force, there have been known plate-like ferrite particles with magnetoplumbite structure which are obtained by substituting a part of Fe therein with metal elements other than Fe, such as Co—Ti, Zn—Ti, Co—Sn or Co—Ti—Sn.

For example, there have been known plate-like ferrite particles with magnetoplumbite structure for magnetic cards, containing Bi, Zn—Ti and the like (Japanese Patent Publication (KOKOKU) No. 7-106910(1995)), plate-like ferrite particles with magnetoplumbite structure, containing Bi and Co—Sn or Co—Ti—Sn (Japanese Patent Application Laid-open (KOKAI) No. 6-231930(1994)), or the like.

Presently, as the particles for the magnetic card, there have been strongly demanded plate-like ferrite particles with magnetoplumbite structure having not only an appropriate particle size, a small coercive force and a large saturation magnetization, but also a small value of switching field distribution (S.F.D.) and an excellent temperature stability. However, plate-like ferrite particles with magnetoplumbite structure which satisfy all of these requirements have not yet been obtained.

More specifically, with respect to the above-mentioned conventional ferrite particles with magnetoplumbite structure in which Fe(III) is partially substituted with Co—Ti, the coercive force thereof can be effectively reduced even when the amount of Fe(III) substituted is small. That is, the plate-like ferrite particles with magnetoplumbite structure can exhibit the desired low coercive force while maintaining a large saturation magnetization thereof.

However, in the case where a part of Fe(III) contained in the particles is substituted with Co—Ti, there arises a problem that the magnetic properties thereof are fluctuated with the elevating in temperature. Especially, the temperature stability as to the coercive force of the particles is deteriorated to such an extent that the change in coercive force with temperature is not less than +4 Oe/° C. Therefore, the plate-like ferrite particles with magnetoplumbite structure are unsuitable as magnetic particles for magnetic cards.

In addition, with respect to the above-mentioned conventional plate-like ferrite particles with magnetoplumbite structure which contain Bi and in which a part of Fe(III) therein is substituted with Zn—Ti, it has been difficult to effectively reduce the coercive force thereof. Therefore, in order to adjust the coercive force to an appropriate low value as required, it is necessary to substitute a large part of Fe(III) with Zn—Ti. This disadvantageously increases the content of the elements which are not concerned with magnetization of the particles, thereby failing to provide plate-like ferrite particles with magnetoplumbite structure having a large saturation magnetization.

Further, the temperature stability of these particles are still unsatisfactory though it can be slightly improved as compared to the particles in which a part of Fe(III) thereof is substituted with Co—Ti.

Furthermore, in the case where the plate-like ferrite particles with magnetoplumbite structure contains Bi and a part of Fe(III) therein is substituted with Co—Sn or Co—Ti—Sn, the coercive force of the particles can be effectively reduced even though the amount of Fe(III) substituted is small. As a result, there can be obtained plate-like ferrite particles with magnetoplumbite structure having a low coercive force as required while maintaining a large saturation magnetization. However, as described in Comparative Examples hereinafter, there arises another problem that the switching field distribution (S.F.D.) thereof is deteriorated. In addition, the temperature stability thereof is still unsatisfactory though it can be slightly improved as compared to those in which a part of Fe(III) therein is substituted with Zn—Ti.

In consequence, it has been presently demanded to provide plate-like ferrite particles with magnetoplumbite structure for magnetic cards, which have not only an appropriate particle size, a low coercive force and a large saturation magnetization, but also a small switching field distribution (S.F.D.) and an excellent temperature stability.

As a result of the present inventors' earnest studies, it has been found that by mixing a barium compound and/or a strontium compound, iron oxide, a bismuth compound, a zinc compound and at least one compound selected from the group consisting of a Nb compound, a Ta compound and a Sn compound, with each other at a specific weight ratio, and heat-treating the resultant mixture at 900 to 1,200° C., the obtained plate-like ferrite particles with magnetoplumbite structure of a specific composition, have an appropriate particle size as desired, a small coercive force, a large saturation magnetization, a small value of switching field distribution (S.F.D.) and an excellent temperature stability. The present invention has been attained based on the finding.

SUMMARY OF THE INVENTION

It is an object of the present invention to provide plate-like ferrite particles with magnetoplumbite structure for magnetic cards, having an appropriate particle size as desired, a small coercive force, a large saturation magnetization, a small value of switching field distribution (S.F.D.) and an excellent temperature stability.

It is another object of the present invention to provide plate-like ferrite particles with magnetoplumbite structure for magnetic cards, having a particle size of 0.30 to 1.50 µm, a coercive force as low as 300 to 1,400 Oe, a saturation magnetization as large as not less than 56 emu/g, a switching field distribution (S.F.D.) as small as not more than 1.3, and such an excellent temperature stability that the change in coercive force with temperature is in the range of −1.5 to +1.5 Oe/° C.

It is a further object of the present invention to provide high-recording density magnetic cards having a coercive force as low as 300 to 1,400 Oe, a saturation magnetic flux density Bm of 900 to 1,300 Gauss, a residual magnetic flux density Br of 850 to 1,200 Gauss, a squareness Br/Bm of not less than 0.91, a switching field distribution (S.F.D.) as low as not more than 0.10, such an excellent temperature stability that the change in coercive force with temperature is in the range of −1.5 to +1.5 Oe/° C., and an excellent gloss as high as not less than 90.

To accomplish the aim, in a first aspect of the present invention, there is provided plate-like ferrite particles with magnetoplumbite structure having a composition represented by the general formula: $AO \cdot n\{(Fe_{1-(a+b)}Bi_aM_b)_2O_3\}$, wherein A is Ba, Sr or Ba—Sr; M is Zn—Nb, Zn—Ta or Zn—Sn; n is from 5.5 to 6.1; a is from 0.001 to 0.005; b is from 0.050 to 0.120, and the ratio of b/a is from 20 to 50.

In a second aspect of the present invention, there is provided plate-like ferrite particles with magnetoplumbite structure having a composition represented by the general formula: $AO \cdot n\{(Fe_{1-(a+b)}Bi_aM_b)_2O_3\}$, wherein A is Ba, Sr or Ba—Sr; M is Zn—Nb, Zn—Ta or Zn—Sn; n is from 5.5 to 6.1; a is from 0.001 to 0.005; b is from 0.050 to 0.120; and the ratio of b/a is from 20 to 50; and having an apparent density of 0.70 to 1.00 g/cm$^3$ and a tap density of 1.75 to 2.10 g/cm$^3$.

In a third aspect of the present invention, there is provided plate-like ferrite particles with magnetoplumbite structure having a composition represented by the general formula: $AO \cdot n\{(Fe_{1-(a+b)}Bi_aM_b)_2O_3\}$, wherein A is Ba, Sr or Ba—Sr; M is Zn—Nb, Zn—Ta or Zn—Sn; n is from 5.5 to 6.1; a is from 0.001 to 0.005; b is from 0.050 to 0.120; and the ratio of b/a is from 20 to 50; and having on the surface thereof, a coat comprising at least one compound selected from the group consisting of hydroxides of aluminum, oxides of aluminum, hydroxides of silicon and oxides of silicon.

In a fourth aspect of the present invention, there is provided plate-like ferrite particles with magnetoplumbite structure having a composition represented by the general formula of $AO \cdot n\{(Fe_{1-(a+b)}Bi_aM_b)_2O_3\}$, wherein A is Ba, Sr or Ba—Sr; M is Zn—Nb, Zn—Ta or Zn—Sn; n is from 5.5 to 6.1; a is from 0.001 to 0.005; b is from 0.050 to 0.120; and the ratio of b/a is from 20 to 50; and having on the surface thereof an attached agent comprising at least one treating agent selected from the group consisting of (a) polyester-based high-molecular dispersant having an amino group, (b) polyester-based high-molecular dispersant having an acid group, (c) silane-based coupling agent having an aminopropyl group, (d) silane-based coupling agent having a mercapto group, and (e) coordinate-type titanium-based coupling agent.

In a fifth aspect of the present invention, there is provided a magnetic card comprising:

(i) a substrate; and (ii) a magnetic tape laminated on said substrate, comprising:

a base film, and a magnetic recording layer formed on said base film, comprising the said plate-like ferrite particles with magnetoplumbite structure defined in the first aspect, and a binder resin.

In a sixth aspect of the present invention, there is provided a magnetic card comprising:

(i) a substrate; and (ii) magnetic recording layer formed on said substrate, comprising said plate-like ferrite particles with magnetoplumbite structure defined in the first aspect, and a binder resin.

DETAILED DESCRIPTION OF THE INVENTION

The present invention is described in detail below.

First, the plate-like ferrite particles with magnetoplumbite structure according to the present invention are explained.

The plate-like ferrite particles with magnetoplumbite structure according to the present invention have a composition represented by the general formula of $AO \cdot n\{(Fe_{1-(a+b)}Bi_aM_b)_2O_3\}$, wherein A is Ba, Sr or Ba—Sr; M is Zn—Nb, Zn—Ta or Zn—Sn; n is from 5.5 to 6.1; a is from 0.001 to 0.005; b is from 0.050 to 0.120, and the ratio of b/a is from 20 to 50.

Thus, the plate-like ferrite particles with magnetoplumbite structure according to the present invention contain Bi and M selected from Zn—Nb, Zn—Ta and Zn—Sn.

In the case where one of Bi and M is not contained in the particles or in the case where M is not any combination of Zn—Nb, Zn—Ta and Zn—Sn, it becomes impossible to obtain the desired plate-like ferrite particles with magnetoplumbite structure according to the present invention, having a small coercive force, a large saturation magnetization, a small value of switching field distribution (S.F.D.) and an excellent temperature stability.

When n is less than 5.5, a large amount of the Ba compound such as $BaO \cdot Fe_2O_3$ or $BaO \cdot 2Fe_2O_3$ is included in the plate-like ferrite particles with magnetoplumbite structure, thereby causing the decrease in saturation magnetization thereof. As a result, there cannot be obtained the desired plate-like ferrite particles with magnetoplumbite structure having a large saturation magnetization. On the other hand, when n is more than 6.1, hematite particles are included in the plate-like ferrite particles with magnetoplumbite structure, thereby also causing the decrease in saturation magnetization thereof. Similarly, there cannot be obtained the desired plate-like ferrite particles with magnetoplumbite structure having a large saturation magnetization.

When a is less than 0.001, there cannot be obtained the desired plate-like ferrite particles with magnetoplumbite structure having a small value of switching field distribution (S.F.D.) and an excellent temperature stability. On the other hand, when a is more than 0.005, the content of elements which do not contribute to the improvement in magnetic properties such as the magnetization of the particles, is increased. As a result, there cannot also be obtained the desired plate-like ferrite particles with magnetoplumbite structure having a large saturation magnetization.

When b is less than 0.050, it becomes difficult to reduce the coercive force of the plate-like ferrite particles with magnetoplumbite structure to not more than 1,400 Oe. On the other hand, when b is more than 0.120, the saturation magnetization of the plate-like ferrite particles with magnetoplumbite structure is decreased.

When the ratio b/a is less than 20 or when the ratio b/a is more than 50, there cannot be obtained the desired plate-like ferrite particles with magnetoplumbite structure having a small value of switching field distribution (S.F.D.).

The plate-like ferrite particles with magnetoplumbite structure according to the present invention have an average plate surface diameter of usually 0.30 to 1.50 $\mu$m, an average thickness of usually 0.05 to 0.60 $\mu$m and a an average plate ratio (plate surface diameter/thickness) of usually 3 to 7.

When the average plate surface diameter is less than 0.30 $\mu$m, it may become difficult to disperse the particles in vehicle. on the other hand, when the plate surface diameter is more than 1.50 $\mu$m, it may become difficult to obtain a coat having a smooth surface, thereby causing the difficulty in producing magnetic cards having a high-recording density. In view of the dispersibility in vehicle and the smoothness of the coat, the average plate surface diameter of the particles is preferably in the range of 0.30 to 1.20 $\mu$m, more preferably 0.35 to 1.20 $\mu$m.

When the average thickness of the particles is less than 0.05 $\mu$m, it may become difficult to disperse the particles in vehicle. On the other hand, when the average thickness is more than 0.60 $\mu$m, it may become difficult to obtain a coat having a smooth surface, thereby causing the difficulty in producing a magnetic card having a high-recording density. In view of the dispersibility in vehicle and the smoothness of the coat, the average thickness is preferably in the range of 0.08 to 0.60 $\mu$m, more preferably 0.10 to 0.50 $\mu$m.

When the average plate ratio (plate surface diameter/thickness) is less than 3 or when the ratio is more than 7, it may become difficult to obtain the particles having a high squareness. In view of such a squareness, the average plate ratio is preferably in the range of 3 to 6.

The plate-like ferrite particles with magnetoplumbite structure according to the present invention have a coercive force of usually 300 to 1,400 Oe. By controlling the amount of M, it is possible to effectively reduce the coercive force of the particles to the desired low value even when a small amount of M is used. The coercive force of the particles may be controlled depending upon the aimed applications. In view of the saturation magnetization and the switching field distribution (S.F.D.), the coercive force of the plate-like ferrite particles with magnetoplumbite structure according to the present invention is preferably in the range of 350 to 1,300 Oe, more preferably 380 to 1,250 Oe.

The saturation magnetization of the plate-like ferrite particles with magnetoplumbite structure according to the present invention is usually not less than 56 emu/g, preferably not less than 57 emu/g, more preferably not less than 58 emu/g. The preferable upper limit of the saturation magnetization is about 60 emu/g.

The switching field distribution (S.F.D.) of the plate-like ferrite particles with magnetoplumbite structure according to the present invention is usually not more than 1.30, preferably not more than 1.23. The preferable lower limit of the switching field distribution (S.F.D.) is about 0.80.

The temperature stability (i.e., change of coercive force with temperature) of the plate-like ferrite particles with magnetoplumbite structure according to the present invention is usually in the range of −1.5 to +1.5 Oe/° C., preferably −1.2 to +1.2 Oe/° C., more preferably −0.8 to +0.8 Oe/° C.

The apparent density of the plate-like ferrite particles with magnetoplumbite structure according to the present invention is usually 0.40 to 0.70 g/cm$^3$ and the tap density thereof is usually 1.20 to 1.75 g/cm$^3$.

Next, the method of producing the plate-like ferrite particles with magnetoplumbite structure according to the present invention is described below.

The plate-like ferrite particles with magnetoplumbite structure according to the present invention can be produced by mixing a barium compound and/or a strontium compound, iron oxide, a bismuth compound, a zinc compound and at least one compound selected from the group consisting of a Nb compound, a Ta compound and a Sn compound with each other at a weight ratio which is capable of obtaining plate-like ferrite particles with magnetoplumbite structure having a composition of AO·n{(Fe$_{1-(a+b)}$Bi$_a$M$_b$)$_2$O$_3$}, wherein A is Ba, Sr or Ba—Sr; M is Zn—Nb, Zn—Ta or Zn—Sn; n is from 5.5 to 6.1; a is from 0.001 to 0.005, b is from 0.050 to 0.120 and the ratio of b/a is from 20 to 50, and heat-treating the resultant mixture at 900 to 1,200° C. in the presence or absence of a flux.

As the iron oxide, there can be used any iron oxide particles such as α-Fe$_2$O$_3$, γ-Fe$_2$O$_3$ or Fe$_3$O$_4$. In addition, ferric oxide hydroxide such as (α-FeOOH, γ-FeOOH or β-FeOOH can also be used.

As the Ba compound or the Sr compound as an auxiliary raw material, there can be used BaCO$_3$, SrCO$_3$ or the like. In addition, Ba compounds or Sr compounds capable of producing BaO or SrO upon heating can also be used.

As the Bi compounds, there can be used Bi$_2$O$_3$, Bi(NO$_3$)$_3$, Bi$_2$O$_2$CO$_3$ or the like. In addition, Bi compounds capable of producing Bi$_2$O$_3$ upon heating can also be used.

As the Zn compounds, there can be used ZnO, Zn(NO$_3$)$_2$, ZnCO$_3$ or the like. In addition, Zn compounds capable of producing ZnO upon heating can also be used.

As the Nb compounds, there can be used Nb$_2$O$_5$ or the like. In addition, Nb compounds capable of producing Nb$_2$O$_5$ upon heating can also be used.

As the Ta compounds, there can be used Ta$_2$O$_5$ or the like. In addition, Ta compounds capable of producing Ta$_2$O$_5$ upon heating can also be used.

As the Sn compounds, there can be used SnO$_2$ or the like. In addition, Sn compounds capable of producing SnO$_2$ upon heating can also be used.

When the temperature used in the above heat-treatment is less than 900° C., the reaction for converting the raw material into ferrite proceeds insufficiently, so that the raw material remains unreacted. On the other hand, when the temperature is more than 1,200° C., unsuitable sintering process proceeds in the particles and/or between the particles, thereby causing the degradation of plate-like shape of the particles or resulting in the formation of coarse particles.

In the above-mentioned heat-treatment, a flux may be used, if required. By using the flux, it becomes possible to prevent the sintering in the particles and/or between the particles from being caused or to prevent the formation of coarse particles from being produced, whereby plate-like ferrite particles with magnetoplumbite structure, which are more suitable for magnetic cards, can be readily produced.

As the flux, there may be used one or more kinds of halides, sulfates and silicates of known alkali metals or alkali earth metals. Examples of the preferred fluxes may include BaCl$_2$, SrCl$_2$, NaCl, KCl, Na$_2$SO$_4$ or the like. Among them, BaCl$_2$ and SrCl$_2$ are more preferred.

The amount of the flux used is preferably not more than 20% by weight, more preferably 1 to 10% by weight, based on the weight of the iron oxide used. When the amount of the flux used is more than 20% by weight, the plate ratio of the obtained plate-like ferrite particles with magnetoplumbite structure may become large, thereby deteriorating the dispersibility thereof, and in addition, the use of too much amount of the flux is not only meaningless but also uneconomical.

In the case where the heat-treatment is conducted in the presence of the flux, after completion of the heat-treatment, the heat-treated particles may be pulverized and then washed with water or aqueous acid solution such as acetic acid or hydrochloric acid by ordinary methods.

As the plate-like ferrite particles with magnetoplumbite structure according to the present invention, there may be preferably used (i) compacted ferrite particles which are subjected to a compaction treatment, (ii) coated ferrite particles which are subjected to a wet surface treatment, (iii) compacted and coated ferrite particles which are subjected to the wet surface treatment and then the compaction treatment, and (iv) compacted and attached (deposited) ferrite particles which are subjected to a dry surface treatment and the compaction treatment. These plate-like ferrite particles with magnetoplumbite structure have a good dispersibility in resins.

The compacted ferrite particles (i) can be produced by subjecting raw plate-like ferrite particles with magnetoplumbite structure to the compaction treatment using an edge runner. The thus obtained compacted ferrite particles not only exhibit the same properties inherent to the above-mentioned plate-like ferrite particles with magnetoplumbite structure, but also have an apparent density of usually 0.70 to 1.00 g/cm$^3$ and a tap density of usually 1.75 to 2.10 g/cm$^3$.

As the edge runner used in the present invention to conduct the compaction and pulverization treatments, there may be exemplified "SAND MILL" (manufactured by MATSUMOTO CHUZO TEKKOSHO CO., LTD.), "MIX MULLER" (manufactured by SHIN-TOH KOCYO CO., LTD.) or the like.

The linear load applied by the edge runner is usually in the range of 15 to 80 kg/cm, preferably 30 to 60 kg/cm. When the linear load is less than 15 kg/cm, the shear force caused by the attrition process may be small, so that no mechanochemical effect may be obtained. On the other hand, when the linear load is more than 80 kg/cm, the shear force caused by the attrition process may be large, so that there may be a risk that the treated particles are broken. Further, the treating time by the edge runner is usually 15 to 120 minutes, preferably 30 to 60 minutes.

The coated ferrite particles (ii) can be produced by mixing a solution containing the raw plate-like ferrite particles with magnetoplumbite structure and an aluminum compound and/or a silica compound, with water to form a suspension and if required, adjusting the pH of the suspension, thereby subjecting the particles to the wet surface treatment to coat surfaces of the particles with at least one compound selected from the group consisting of hydroxides of aluminum, oxides of aluminum, hydroxides of silicon and oxides of silicon.

The amount of the coat onto surfaces of the particles may be usually in the range of 0.01 to 2.00% by weight, preferably 0.50 to 1.50% by weight (calculated as Al and/or $SiO_2$) based on the weight of the particles to be treated.

In the case where on the surfaces of the particles the oxides of aluminum or the hydroxides of aluminum are formed, the pH of the above-obtained suspension may be adjusted to 4 to 12. On the other hand, in the case where on the surfaces of the particles the oxides of silicon or the hydroxides of silicon are formed, the pH of the suspension may be adjusted to not more than 9.5.

As the Al compounds, there may be used alkali aluminates such as sodium aluminate or potassium aluminate, aluminum salts such as aluminum sulfate, aluminum chloride or aluminum nitrate, or the like. These Al compounds may be used in the form of an aqueous solution.

As the Si compounds, there may be used sodium silicate, potassium silicate, colloidal silica, #3 water glass, or the like. These Si compounds may be used in the form of an aqueous solution.

The amount of the aqueous solution containing the Al compound and/or the Si compound may be controlled in such a manner that the amount of the coat formed on the surfaces of the particles is within the above-mentioned range. That is, the Al compound and/or the Si compound may be added in an amount of usually 0.01 to 2.00% by weight (calculated as Al or $SiO_2$) based on the weight of the ferrite particles. In this case, substantially a whole amount of Al and/or Si in the Al compound and/or the Si compound added is attached onto the surfaces of the particles.

The pH of the suspension may be controlled by adding an aqueous alkaline solution or an acid thereto. As the aqueous alkaline solutions, there may be exemplified a sodium hydroxide solution, a potassium hydroxide solution, ammonia water or the like. As the acids, there may be exemplified sulfuric acid, hydrochloric acid, acetic acid, nitric acid, carbon dioxide gas or the like.

The coated ferrite particles (ii) subjected to the wet surface treatment can have the same properties inherent to the above-mentioned plate-like ferrite particles with magnetoplumbite structure.

The compacted and coated ferrite particles (iii) can be produced by subjecting the raw plate-like ferrite particles with magnetoplumbite structure to the above-mentioned wet surface treatment, followed by filtrating, water-washing and drying, and then subjecting the surface-treated ferrite particles to the compaction treatment.

The thus obtained compacted and coated ferrite particles (iii) can have the same properties inherent to the above-mentioned plate-like ferrite particles with magnetoplumbite structure. In addition, the amount of the coat formed on the surfaces of the ferrite particles is usually in the range of 0.01 to 2.00% by weight, preferably 0.50 to 1.50% by weight (calculated as Al or $SiO_2$) based on the total weight of the ferrite particles, and the apparent density thereof is usually in the range of 0.70 to 1.00 $g/cm^3$ and the tap density thereof is usually in the range of 1.75 to 2.10 $g/cm^3$.

The compacted and attached ferrite particles (iv) can be produced by subjecting the raw plate-like ferrite particles with magnetoplumbite structure to a dry surface treatment and the above-mentioned compaction treatment, simultaneously or successively.

The dry surface treatment can be conducted by a dry-mixing method of charging the plate-like ferrite particles with magnetoplumbite structure into a Henschel mixer or an edge runner, adding treating agents thereto, and dry-mixing the ferrite particles and the treating agents.

As the treating agents used in the dry surface treatment, there may be exemplified the following agents:
(a) Polyester-based high-molecular dispersant having an amino group;
(b) Polyester-based high-molecular dispersant having an acid group;
(c) Silane-based coupling agent having an aminopropyl group;
(d) Silane-based coupling agent having a mercapto group; and
(e) Coordinate-type titanium-based coupling agent.

Specifically, examples of the polyester-based high-molecular dispersants (a) having an amino group may include a commercially available dispersant: "Solsperse-24000GR" (tradename, produced by ICI Corp.), or the like.

Examples of the polyester-based high-molecular dispersants (b) having an acid group may include a commercially available dispersant: "Solsperse-3000" (tradename, produced by ICI Corp.), or the like.

Examples of the silane-based coupling agents (c) having an aminopropyl group may include N-β-(aminoethyl)-γ-aminopropyl methyl dimethoxysilane, N-β-(aminoethyl)-γ-aminopropyl trimethoxysilane, N-β-(aminoethyl)-γ-aminopropyl triethoxysilane, γ-aminopropyl trimethoxysilane, γ-aminopropyl triethoxysilane, N-phenyl-γ-aminopropyl trimethoxysilane or the like.

Examples of the silane-based coupling agents (d) having a mercapto group may include γ-mercaptopropyl trimethoxysilane, γ-mercaptopropyl triethoxysilane or the like. As commercially available products of γ-mercaptopropyl trimethoxysilane, there can be exemplified "A-189" (tradename, produced by NIPPON UNICAR Co., Ltd.).

Examples of the coordinate-type titanium-based coupling agents (e) may include titanate-based coupling agents such as tetra(2,2-diallyloxymethyl-1-butyl)-bis(di-tridecyl) phosphite titanate, or the like. As commercially available products of the coordinate-type titanium-based coupling agents (e), there can be exemplified "KR-55" (tradename, produced by AJINOMOTO Co., Ltd.).

The amount of the treating agent attached on the surfaces of the particles by the dry surface treatment is in the range of usually 0.02 to 1.95% by weight (calculated as C) based on the total weight of the ferrite particles.

The ferrite particles (iv) subjected to the compaction treatment and the dry surface treatment can have not only the same properties inherent to the above-mentioned plate-like ferrite particles with magnetoplumbite structure, but also an apparent density of usually 0.70 to 1.00 $g/cm^3$, and a tap density of usually 1.75 to 2.10 $g/cm^3$.

In the present invention, (i) the wet surface treatment and the compaction treatment, or (ii) the dry surface treatment and the compaction treatment may be repeated at least two times, preferably 2 to 5 times. Even if the procedure is repeated more than 5 times, no further effect cannot be obtained because it is already saturated, and such a repeated procedure becomes industrially disadvantageous.

Next, the magnetic tape using the plate-like ferrite particles with magnetoplumbite structure for magnetic cards according to the present invention is described below.

The magnetic tape according to the present invention comprises a non-magnetic substrate such as a base film, and a magnetic recording layer formed on the non-magnetic substrate.

The magnetic recording layer can be formed by applying a magnetic coating material comprising magnetic particles, a bender resin and a solvent onto the non-magnetic substrate and then drying the coating material applied. The thickness of the magnetic recording layer is usually in the range of 1.0 to 15.0 μm, preferably 3.0 to 12.0 μm.

As the binder resins, there may be exemplified various binders generally used for the production of magnetic tapes. Specific examples of the binder resins may include vinyl chloride/vinyl acetate copolymers, urethane resins, vinyl chloride/vinyl acetate/maleic acid urethane elastomers, butadiene/acrylonitrile copolymers, polyvinyl butyral, cellulose derivatives such as nitrocellulose, polyester resins, synthetic rubber-based resins such as polybutadiene, epoxy resins, polyamide resins, polyisocyanate polymers, electron beam curable acryl/urethane resins, or a mixture thereof. These resins may contain polar groups such as —OH, —COOH, —SO$_3$M, —OPO$_2$M$_2$ or —NH$_2$, wherein M represents H, Na or K.

The magnetic tape obtained by using the plate-like ferrite particles with magnetoplumbite structure according to the present invention, has a coercive force of usually 300 to 1,400 Oe, preferably 350 to 1,300 Oe, more preferably 350 to 1,250 Oe, a saturation magnetic flux density Bm of usually 900 to 1,300 Gauss, preferably 1,000 to 1,300 Gauss, a residual magnetic flux density Br of usually 850 to 1,200 Gauss, preferably 930 to 1,200 Gauss, a squareness (Br/Bm) of usually not less than 0.91, preferably not less than 0.92, a switching field distribution (S.F.D.) of usually not more than 0.10, preferably not more than 0.08, more preferably not more than 0.06, a temperature stability of usually −1.5 to +1.5 Oe/° C., preferably −1.2 to +1.2 Oe/° C., more preferably −0.8 to +0.8 Oe/° C., and a gloss of usually not less than 90%, preferably not less than 91%; in which the preferable upper limit of the gloss is 100%.

In case of using as the plate-like ferrite particles with magnetoplumbite structure, the compacted ferrite particles (i), the coated ferrite particles (ii), the compacted and coated ferrite particles (iii) or the compacted and attached ferrite particles (iv), the gloss of the magnetic tape is preferably not lass than 91%, more preferably not less than 92%, even more preferably not less than 93%; the squareness (Br/Bm) of the magnetic tape is preferably not less than 0.92, more preferably not less than 0.93; and the switching field distribution (S.F.D.) of the magnetic tape is preferably not more than 0.08, more preferably not more than 0.06.

The amount of the magnetic particles contained in the magnetic recording layer is in the range of usually 50 to 2,000 parts by weight, preferably 200 to 1,500 parts by weight based on 100 parts by weight of the binder resin. When the amount of the magnetic particles in the magnetic recording layer is less than 50 parts by weight, there may arise a risk that the magnetic recording layer cannot exhibit a sufficient signal recording property. On the other hand, when the amount of the magnetic particles in the magnetic recording layer is more than 2,000 parts by weight, though a satisfactory signal recording property can be obtained, the amount of the binder resin becomes too small relative to that of the magnetic particles, resulting in not only poor dispersibility of the magnetic particles in the binder resin, but also formation of extremely brittle magnetic coat since the magnetic particles cannot be kept bound in the binder resin.

The magnetic recording layer may further contain generally known additives such as lubricants, abrasives or antistatic agents.

As the non-magnetic substrate such as a base film, there may be used various films or sheets generally used for the production of magnetic tapes. Examples of these non-magnetic substrates may include films made of synthetic resins such as polyethylene terephthalate, polyethylene, polypropylene, polycarbonates, polyethylene naphthalate, polyamides, polyamidimides or polyimides, foils or sheets made of metals such as aluminum or stainless steel, various papers or the like. The thickness of these non-magnetic substrates is varied depending on kinds of materials used, but usually in the range of 1.0 to 300 μm, preferably 2.0 to 200 μm.

As the solvents used for forming a coating material for the magnetic recording layer, there may be exemplified methyl ethyl ketone, toluene, cyclohexanone, methyl isobutyl ketone, tetrahydrofuran or the like.

The important point of the present invention exists in the following. That is, as described in Examples and Comparative Examples hereinafter, in any of the cases where the plate-like ferrite particles with magnetoplumbite structure contain no Bi but contain only any one of Zn—Nb, Zn—Ta and Zn—Sn; where the plate-like ferrite particles with magnetoplumbite structure contain none of Zn—Nb, Zn—Ta and Zn—Sn but contain only Bi; where the plate-like ferrite particles with magnetoplumbite structure contain any of Zn—Nb, Zn—Ta and Zn—Sn but contain Bi in an amount out of the above-specified range; and where the plate-like ferrite particles with magnetoplumbite structure contain Bi but contain any of Zn—Nb, Zn—Ta and Zn—Sn in an amount out of the above-specified range, there cannot be obtained the desired plate-like ferrite particles with magnetoplumbite structure, having a low coercive force, e.g., usually 300 to 1,400 Oe, a large saturation magnetization, e.g., usually not less than 56 emu/g, a small switching field distribution (S.F.D.), e.g., usually not more than 1.30, and an excellent temperature stability, e.g., usually −1.5 to +1.5 Oe/° C. Accordingly, it is considered that the plate-like ferrite particles with magnetoplumbite structure according to the present invention can be obtained by the synergistic effect of Bi and any of Zn—Nb, Zn—Ta and Zn—Sn, both of which are contained in such amounts of the above-specified ranges.

Owing to the appropriate particle size, especially 0.30 to 1.50 μm, and the composition represented by the general formula of AO·n{(Fe$_{1-(a+b)}$Bi$_a$M$_b$)$_2$O$_3$}, wherein A is Ba, Sr or Ba—Sr; M is Zn—Nb, Zn—Ta or Zn—Sn; n is from 5.5 to 6.1; a is from 0.001 to 0.005; b is from 0.050 to 0.120; and the ratio of b/a is from 20 to 50. Owing to these characteristics, the plate-like ferrite particles with magnetoplumbite structure according to the present invention can exhibit a coercive force as low as, especially, 300 to 1,400 Oe, a saturation magnetization as large as, especially, not less than 56 emu/g, a switching field distribution (S.F.D.) as small as, especially, not more than 1.3, and an excellent temperature stability (i.e., the change in coercive force with temperature) of −1.5 to +1.5 Oe/° C. Therefore, the plate-like ferrite particles with magnetoplumbite structure according to the present invention can be suitably used as magnetic particles for the production of magnetic cards.

Further, the magnetic tape produced by using the above-mentioned plate-like ferrite particles with magnetoplumbite structure according to the present invention, can exhibit a low coercive force, especially 300 to 1,400 Oe, a saturation magnetic flux density Bm of 900 to 1,300 Gauss, a residual magnetic flux density Br of 850 to 1,200 Gauss, a squareness Br/Bm of not less than 0.91, a switching field distribution (S.F.D.) as small as, especially, not more than 0.10, a temperature stability (change in coercive force with temperature) of −1.5 to +1.5 Oe/° C., and a gloss of not less than 90. Accordingly, the magnetic tape can be suitably used for the production of high-recording density magnetic cards.

EXAMPLES

The present invention is described in more detail by examples and comparative examples, but these examples are not intended to limit the scope of the present invention.

Various sizes or properties of plate-like ferrite particles with magnetoplumbite structure and magnetic tape produced by using the particles were measured in the following manner.

(1) Plate Surface Diameter and Thickness of Particles:

About 350 particles on an enlarged photograph obtained by magnifying a photomicrograph (×30,000) obtained by a scanning electron microscope up to 4 times in each of vertical and horizontal directions, were measured with respect to plate surface diameters thereof. An average of the measured values was used as plate surface diameter of the particles. Also, using the same enlarged photograph as described above, about 100 particles were extracted from only those kept in upright condition and measured with respect to thicknesses thereof. An average of the measured values was used as thickness of the particles.

(2) Apparent Density and Tap Density of Particles:

The apparent density and the tap density of the particles were measured by a method according to JIS K 5101.

(3) Compaction Density of Particles:

25 g of sample particles were filled in a cylindrical metal mold, and a pressure of 1 ton/cm$^2$ was applied to the particles by a bench pressing machine to form a cylindrical molded product. The weight and volume of the cylindrical molded product were measured to calculate a compaction density of the particles according to the following equation:

$$\text{Compaction density (g/cm}^3\text{)} = \text{(weight of molded product)}/\{(\text{radius (cm) of mold})^2 \times (\text{height (cm) of molded product}) \times \pi\}$$

(4) Amounts of Al and Si in Coat Formed on Particles:

The amounts of Al and Si contained in the coat were measured by X-ray fluorescence spectroscopy.

(5) Amount of High-Molecular Dispersant Attached on Particles:

The amount (calculated as C) of a high-molecular dispersant attached on surfaces of the particles was measured by "Horiba Metal, Carbon and Sulfur Analyzer EMIA-2200 Model" (manufactured by HORIBA SEISAKUSHO CO., LTD.).

(6) Magnetic Properties of Particles and a Magnetic Tape:

The magnetic properties of the particles and the magnetic tape were measured by applying a maximum external magnetic field of 10 kOe thereto using "Sample-Vibration type Magnetometer VSM-3S-15" (manufactured by TOEI KOGYO CO., LTD.).

(7) Switching Field Distribution (S.F.D.):

By using a differentiating circuit in the above-mentioned magnetometer, the differential curve of the magnetization curve of the particles or the magnetic tape was obtained to measure a full width at a half maximum of the curve. The measured value was divided by the coercive force at the peak value of the curve to obtain a switching field distribution (S.F.D.) of the particles or the magnetic tape.

(8) Temperature Stability as to Coercive Force of Particles and Magnetic Tape:

The difference in coercive force between −10° C. and 120° C. was divided by the temperature difference between −10° C. and 120° C. (i.e., 130° C.). The obtained value was expressed by unit of Oe/° C.

(9) Gloss of the Surface of Coating Layer:

The gloss on the surface of coating layer was measured by "Glossmeter UGV-5G" (manufactured by SUGA TESTING MACHINES MFG., CO., LTD.).

Example 1

<Preparation of Plate-Like Ferrite Particles with Magnetoplumbite Structure>

800 g of iron oxide (α-Fe$_2$O$_3$), 190.0 g of barium carbonate (BaCO$_3$), 5.5 g of bismuth oxide (Bi$_2$O$_3$), 57.1 g of zinc oxide (ZnO) and 46.6 g of niobium oxide (Nb$_2$O$_5$) were intimately mixed together. Thereafter, the obtained mixture was placed in a crucible made of alumina and heat-treated at 1,050° C. for 2 hours by an electric furnace.

Next, the heat-treated product was pulverized by an ordinary method to obtain brown particles.

The thus obtained brown particles were analyzed by X-ray diffraction and X-ray fluorescence spectroscopy. As a result of the analysis, the obtained particles were identified as plate-like barium ferrite particles with magnetoplumbite structure having a composition of BaO·5.76{(Fe$_{0.9031}$Bi$_{0.0021}$Zn$_{0.0632}$Nb$_{0.0316}$)$_2$O$_3$}. Further, it was confirmed that the obtained particles exhibited an average plate surface diameter of 0.76 μm, an average thickness of 0.20 μm and an average plate ratio (plate surface diameter/thickness) of 3.8.

With respect to magnetic properties of the obtained plate-like barium ferrite particles with magnetoplumbite structure, the coercive force Hc thereof was 954 Oe, the saturation magnetization σs was 59.1 emu/g, the switching field distribution (S.F.D.) was 1.08, and the temperature stability as to coercive force was +0.2 Oe/° C.

Example 2

<Production of Magnetic Tape>

100 parts by weight of the plate-like barium ferrite particles with magnetoplumbite structure obtained in Example 1, 14 parts by weight of vinyl chloride/vinyl acetate/vinyl alcohol copolymer (produced by Union Carbide Corp.), 1 part by weight of myristic acid, 30 parts by weight of toluene, 30 parts by weight of methyl ethyl ketone, 1 part by weight of Al$_2$O$_3$ particles and 2 parts by weight of carbon black were kneaded together for 90 minutes using a kneader. The kneaded mixture was mixed with 45 parts by weight of toluene and 45 parts by weight of methyl ethyl ketone to form a diluted mixture. The resultant mixture was then mixed and dispersed for 3 hours by a sand grinder.

140 parts by weight of a methyl ethyl ketone solution containing 14 parts by weight of polyurethane resin as a solid content (Tradename: NIPPORAN 2304 produced by NIPPON POLYURETHANE KOGYO CO., LTD.) was added to the resultant dispersion and mixed together for 30 minutes, followed by filtrating. The obtained filtrated product was mixed with 3 parts by weight of trifunctional low-molecular weight isocyanate (Tradename: COLONATE L produced by NIPPON POLYURETHANE KOGYO CO., LTD.) to prepare a magnetic coating material.

The thus obtained magnetic coating material was applied onto a polyester base film having a thickness of 12 μm, and then dried to form a magnetic layer having a thickness of 4 μm on the base film. The resultant coated film was subjected to calendar treatment, and cut into strips having a width of 3.81 mm to form a magnetic tape.

With respect to magnetic properties of the thus obtained magnetic tape, the coercive force Hc was 960 Oe, the saturation magnetic flux density Bm was 1,108 Gauss, the residual magnetic flux density Br was 1,025 Gauss, the squareness (Br/Bm) was 0.925, the switching field distribution (S.F.D.) was 0.05, the temperature stability was +0.3 Oe/° C., and the gloss was 95%.

Example 3

<Preparation of Plate-Like Ferrite Particles with Magnetoplumbite Structure>

The same procedure as defined in Example 1 was conducted except that 185.7 g of $BaCO_3$, 5.0 g of $Bi_2O_3$ and 40.0 g of $BaCl_2 \cdot 2H_2O$ as a flux were used as raw materials, the obtained mixture was heat-treated at 1,020° C. for 2 hours and the resultant heat-treated mixture was pulverized by an ordinary method and washed with water to remove the flux therefrom, followed by filtrating and drying, thereby producing plate-like ferrite particles with magnetoplumbite structure.

The production conditions and various properties of the particles are shown in Tables 1 and 5.

Examples 4 to 29 and Comparative Examples 1 to 19

The same procedure as defined in Example 1 was conducted except that the kinds and amounts of iron oxide as a main raw material, the kinds and amounts of auxiliary raw materials, the amounts of Bi compound, Zn compound, Nb compound, Ta compound, Sn compound, Ti compound and Co compound, the addition or non-addition of the flux and the temperature and time used in the heat-treatment were variously changed as tabulated in Tables 1 to 8, thereby producing plate-like ferrite particles with magnetoplumbite structure.

The production conditions and various properties of the particles are also shown in Tables 1 to 8.

TABLE 1

| Examples and Comparative Examples | Production of plate-like ferrite particles with magnetoplumbite structure for magnetic cards | | | | | |
|---|---|---|---|---|---|---|
| | Iron oxide | | Auxiliary raw material | | Bi compound | |
| | Kind | Amount (g) | Kind | Amount (g) | Kind | Amount (g) |
| Example 1 | α-Fe₂O₃ | 800.0 | BaCO₃ | 190.0 | Bi₂O₃ | 5.5 |
| Example 3 | α-Fe₂O₃ | 800.0 | BaCO₃ | 185.7 | Bi₂O₃ | 5.0 |
| Example 4 | α-Fe₂O₃ | 800.0 | BaCO₃ | 190.0 | Bi₂O₃ | 5.5 |
| Example 5 | α-FeOOH | 890.2 | BaCO₃ | 182.7 | Bi₂O₃ | 12.1 |
| Example 6 | γ-Fe₂O₃ | 800.0 | BaCO₃ | 181.5 | Bi₂O₃ | 5.5 |
| Example 7 | γ-Fe₂O₃ | 800.0 | BaCO₃ | 180.6 | Bi₂O₃ | 5.5 |
| Example 8 | α-Fe₂O₃ | 800.0 | BaCO₃ | 189.3 | Bi₂O₃ | 5.5 |
| Example 9 | α-Fe₂O₃ | 800.0 | SrCO₃ | 142.7 | Bi₂O₃ | 5.5 |
| Example 10 | α-Fe₂O₃ | 800.0 | BaCO₃ | 104.5 | Bi₂O₃ | 5.5 |
| | | | SrCO₃ | 64.1 | | |
| Example 11 | α-Fe₂O₃ | 800.0 | BaCO₃ | 199.0 | Bi₂O₃ | 5.5 |
| Example 12 | α-Fe₂O₃ | 800.0 | BaCO₃ | 195.7 | Bi₂O₃ | 3.8 |
| Example 13 | α-Fe₂O₃ | 800.0 | BaCO₃ | 190.0 | Bi₂O₃ | 5.7 |
| Example 14 | α-Fe₂O₃ | 800.0 | BaCO₃ | 191.3 | Bi₂O₃ | 9.5 |
| Example 15 | α-Fe₂O₃ | 800.0 | BaCO₃ | 185.3 | Bi₂O₃ | 5.6 |

TABLE 1-continued

| Examples and Comparative Examples | Production of plate-like ferrite particles with magnetoplumbite structure for magnetic cards | | | | | |
|---|---|---|---|---|---|---|
| | Zn compound | | Nb compound | | Ta compound | |
| | Kind | Amount (g) | Kind | Amount (g) | Kind | Amount (g) |
| Example 1 | ZnO | 57.1 | Nb₂O₅ | 46.6 | — | — |
| Example 3 | ZnO | 57.1 | Nb₂O₅ | 46.6 | — | — |
| Example 4 | ZnO | 57.1 | Nb₂O₅ | 46.6 | — | — |
| Example 5 | ZnO | 57.3 | Nb₂O₅ | 46.7 | — | — |
| Example 6 | ZnO | 52.7 | Nb₂O₅ | 43.0 | — | — |
| Example 7 | ZnO | 59.2 | Nb₂O₅ | 48.2 | — | — |
| Example 8 | ZnO | 57.1 | Nb₂O₅ | 46.6 | — | — |
| Example 9 | ZnO | 57.1 | Nb₂O₅ | 46.6 | — | — |
| Example 10 | ZnO | 57.1 | Nb₂O₅ | 46.6 | — | — |
| Example 11 | ZnO | 57.1 | Nb₂O₅ | 46.6 | — | — |
| Example 12 | ZnO | 32.7 | — | — | — | — |
| Example 13 | ZnO | 32.7 | — | — | — | — |
| Example 14 | ZnO | 32.7 | — | — | — | — |
| Example 15 | ZnO | 30.8 | — | — | — | — |

| Examples and Comparative Examples | Production of plate-like ferrite particles with magnetoplumbite structure for magnetic cards | | | | | |
|---|---|---|---|---|---|---|
| | Sn compound | | Ti compound | | Co compound | |
| | Kind | Amount (g) | Kind | Amount (g) | Kind | Amount (g) |
| Example 1 | — | — | — | — | — | — |
| Example 3 | — | — | — | — | — | — |
| Example 4 | — | — | — | — | — | — |
| Example 5 | — | — | — | — | — | — |
| Example 6 | — | — | — | — | — | — |
| Example 7 | — | — | — | — | — | — |
| Example 8 | — | — | — | — | — | — |
| Example 9 | — | — | — | — | — | — |
| Example 10 | — | — | — | — | — | — |
| Example 11 | — | — | — | — | — | — |
| Example 12 | SnO₂ | 71.0 | — | — | — | — |
| Example 13 | SnO₂ | 71.0 | — | — | — | — |
| Example 14 | SnO₂ | 71.0 | — | — | — | — |
| Example 15 | SnO₂ | 57.4 | — | — | — | — |

TABLE 2

| Examples and Comparative Examples | Production of plate-like ferrite particles with magnetoplumbite structure for magnetic cards | | | | | |
|---|---|---|---|---|---|---|
| | Iron oxide | | Auxiliary raw material | | Bi compound | |
| | Kind | Amount (g) | Kind | Amount (g) | Kind | Amount (g) |
| Example 16 | α-Fe₂O₃ | 800.0 | BaCO₃ | 190.3 | Bi₂O₃ | 5.7 |
| Example 17 | α-Fe₂O₃ | 800.0 | BaCO₃ | 191.3 | Bi₂O₃ | 5.7 |
| Example 18 | α-Fe₂O₃ | 800.0 | SrCO₃ | 144.2 | Bi₂O₃ | 5.7 |
| Example 19 | α-Fe₂O₃ | 800.0 | BaCO₃ | 102.2 | Bi₂O₃ | 5.7 |
| | | | SrCO₃ | 62.7 | | |
| Example 20 | α-Fe₂O₃ | 800.0 | BaCO₃ | 202.1 | Bi₂O₃ | 5.7 |
| Example 21 | α-Fe₂O₃ | 800.0 | BaCO₃ | 193.6 | Bi₂O₃ | 4.1 |
| Example 22 | α-Fe₂O₃ | 800.0 | BaCO₃ | 190.0 | Bi₂O₃ | 5.6 |
| Example 23 | α-Fe₂O₃ | 800.0 | BaCO₃ | 189.4 | Bi₂O₃ | 8.4 |
| Example 24 | α-Fe₂O₃ | 800.0 | BaCO₃ | 189.7 | Bi₂O₃ | 5.5 |
| Example 25 | α-Fe₂O₃ | 800.0 | BaCO₃ | 189.2 | Bi₂O₃ | 5.5 |
| Example 26 | α-Fe₂O₃ | 800.0 | BaCO₃ | 195.5 | Bi₂O₃ | 5.6 |
| Example 27 | α-Fe₂O₃ | 800.0 | SrCO₃ | 144.0 | Bi₂O₃ | 5.6 |
| Example 28 | α-Fe₂O₃ | 800.0 | BaCO₃ | 102.5 | Bi₂O₃ | 5.6 |
| | | | SrCO₃ | 62.9 | | |

TABLE 2-continued

Production of plate-like ferrite particles with magnetoplumbite structure for magnetic cards

| Examples and Comparative Examples | Zn compound Kind | Amount (g) | Nb compound Kind | Amount (g) | Ta compound Kind | Amount (g) |
|---|---|---|---|---|---|---|
| Example 16 | ZnO | 39.1 | — | — | — | — |
| Example 17 | ZnO | 32.7 | — | — | — | — |
| Example 18 | ZnO | 32.7 | — | — | — | — |
| Example 19 | ZnO | 57.1 | — | — | — | — |
| Example 20 | ZnO | 57.1 | — | — | — | — |
| Example 21 | ZnO | 44.8 | — | — | $Ta_2O_5$ | 46.6 |
| Example 22 | ZnO | 44.8 | — | — | $Ta_2O_5$ | 46.6 |
| Example 23 | ZnO | 44.8 | — | — | $Ta_2O_5$ | 46.7 |
| Example 24 | ZnO | 38.5 | — | — | $Ta_2O_5$ | 40.1 |
| Example 25 | ZnO | 58.8 | — | — | $Ta_2O_5$ | 61.3 |
| Example 26 | ZnO | 44.8 | — | — | $Ta_2O_5$ | 46.6 |
| Example 27 | ZnO | 44.8 | — | — | $Ta_2O_5$ | 46.6 |
| Example 28 | ZnO | 44.8 | — | — | $Ta_2O_5$ | 46.6 |

Production of plate-like ferrite particles with magnetoplumbite structure for magnetic cards

| Examples and Comparative Examples | Sn compound Kind | Amount (g) | Ti compound Kind | Amount (g) | Co compound Kind | Amount (g) |
|---|---|---|---|---|---|---|
| Example 16 | $SnO_2$ | 84.9 | — | — | — | — |
| Example 17 | $SnO_2$ | 71.0 | — | — | — | — |
| Example 18 | $SnO_2$ | 71.0 | — | — | — | — |
| Example 19 | $SnO_2$ | 71.0 | — | — | — | — |
| Example 20 | $SnO_2$ | 71.0 | — | — | — | — |
| Example 21 | — | — | — | — | — | — |
| Example 22 | — | — | — | — | — | — |
| Example 23 | — | — | — | — | — | — |
| Example 24 | — | — | — | — | — | — |
| Example 25 | — | — | — | — | — | — |
| Example 26 | — | — | — | — | — | — |
| Example 27 | — | — | — | — | — | — |
| Example 28 | — | — | — | — | — | — |

TABLE 3

Production of plate-like ferrite particles with magnetoplumbite structure for magnetic cards

| Examples and Comparative Examples | Iron oxide Kind | Amount (g) | Auxiliary raw material Kind | Amount (g) | Bi compound Kind | Amount (g) |
|---|---|---|---|---|---|---|
| Example 29 | $\alpha\text{-}Fe_2O_3$ | 800.0 | $BaCO_3$ | 201.6 | $Bi_2O_3$ | 5.6 |
| Comparative Example 1 | $\alpha\text{-}Fe_2O_3$ | 800.0 | $BaCO_3$ | 185.0 | $Bi_2O_3$ | 4.1 |
| Comparative Example 2 | $\alpha\text{-}Fe_2O_3$ | 800.0 | $BaCO_3$ | 190.3 | $Bi_2O_3$ | 42.9 |
| Comparative Example 3 | $\alpha\text{-}Fe_2O_3$ | 800.0 | $BaCO_3$ | 191.3 | — | — |
| Comparative Example 4 | $\alpha\text{-}Fe_2O_3$ | 800.0 | $SrCO_3$ | 144.2 | $Bi_2O_3$ | 160.2 |
| Comparative Example 5 | $\alpha\text{-}Fe_2O_3$ | 800.0 | $BaCO_3$ | 167.3 | $Bi_2O_3$ | 5.5 |
| Comparative Example 6 | $\alpha\text{-}Fe_2O_3$ | 800.0 | $BaCO_3$ | 217.1 | $Bi_2O_3$ | 5.5 |
| Comparative Example 7 | $\alpha\text{-}Fe_2O_3$ | 800.0 | $BaCO_3$ | 188.7 | $Bi_2O_3$ | 26.4 |
| Comparative Example 8 | $\alpha\text{-}Fe_2O_3$ | 800.0 | $BaCO_3$ | 188.7 | $Bi_2O_3$ | 1.3 |
| Comparative Example 9 | $\alpha\text{-}Fe_2O_3$ | 800.0 | $BaCO_3$ | 188.7 | $Bi_2O_3$ | 5.8 |
| Comparative Example 10 | $\alpha\text{-}Fe_2O_3$ | 800.0 | $BaCO_3$ | 188.7 | $Bi_2O_3$ | 5.1 |
| Comparative Example 11 | $\alpha\text{-}Fe_2O_3$ | 800.0 | $BaCO_3$ | 184.0 | $Bi_2O_3$ | 3.1 |

Production of plate-like ferrite particles with magnetoplumbite structure for magnetic cards

| Examples and Comparative Examples | Zn compound Kind | Amount (g) | Nb compound Kind | Amount (g) | Ta compound Kind | Amount (g) |
|---|---|---|---|---|---|---|
| Example 29 | ZnO | 44.8 | — | — | $Ta_2O_5$ | 46.6 |
| Comparative Example 1 | ZnO | 57.1 | $Nb_2O_5$ | 46.6 | — | — |
| Comparative Example 2 | ZnO | 57.9 | $Nb_2O_5$ | 47.3 | — | — |
| Comparative Example 3 | ZnO | 57.0 | $Nb_2O_5$ | 46.5 | — | — |
| Comparative Example 4 | — | — | — | — | — | — |
| Comparative Example 5 | ZnO | 57.1 | $Nb_2O_5$ | 46.6 | — | — |
| Comparative Example 6 | ZnO | 57.1 | $Nb_2O_5$ | 46.6 | — | — |
| Comparative Example 7 | ZnO | 57.6 | $Nb_2O_5$ | 47.0 | — | — |
| Comparative Example 8 | ZnO | 55.9 | $Nb_2O_5$ | 46.5 | — | — |
| Comparative Example 9 | ZnO | 88.6 | $Nb_2O_5$ | 72.3 | — | — |
| Comparative Example 10 | ZnO | 16.9 | $Nb_2O_5$ | 13.8 | — | — |
| Comparative Example 11 | ZnO | 32.7 | — | — | — | — |

Production of plate-like ferrite particles with magnetoplumbite structure for magnetic cards

| Examples and Comparative Examples | Sn compound Kind | Amount (g) | Ti compound Kind | Amount (g) | Co compound Kind | Amount (g) |
|---|---|---|---|---|---|---|
| Example 29 | — | — | — | — | — | — |
| Comparative Example 1 | — | — | — | — | — | — |
| Comparative Example 2 | — | — | — | — | — | — |
| Comparative Example 3 | — | — | — | — | — | — |
| Comparative Example 4 | — | — | — | — | — | — |
| Comparative Example 5 | — | — | — | — | — | — |
| Comparative Example 6 | — | — | — | — | — | — |
| Comparative Example 7 | — | — | — | — | — | — |
| Comparative Example 8 | — | — | — | — | — | — |
| Comparative Example 9 | — | — | — | — | — | — |
| Comparative Example 10 | — | — | — | — | — | — |
| Comparative Example 11 | $SnO_2$ | 70.9 | — | — | — | — |

TABLE 4

Production of plate-like ferrite particles with magnetoplumbite structure for magnetic cards

| Examples and Comparative Examples | Iron oxide Kind | Amount (g) | Auxiliary raw material Kind | Amount (g) | Bi compound Kind | Amount (g) |
|---|---|---|---|---|---|---|
| Comparative Example 12 | α-Fe$_2$O$_3$ | 800.0 | BaCO$_3$ | 185.3 | Bi$_2$O$_3$ | 40.5 |
| Comparative Example 13 | α-Fe$_2$O$_3$ | 800.0 | BaCO$_3$ | 191.0 | Bi$_2$O$_3$ | 3.0 |
| Comparative Example 14 | α-Fe$_2$O$_3$ | 800.0 | BaCO$_3$ | 193.6 | Bi$_2$O$_3$ | 47.9 |
| Comparative Example 15 | α-Fe$_2$O$_3$ | 800.0 | BaCO$_3$ | 190.0 | — | — |
| Comparative Example 16 | α-Fe$_2$O$_3$ | 800.0 | BaCO$_3$ | 195.5 | — | — |
| Comparative Example 17 | α-Fe$_2$O$_3$ | 800.0 | BaCO$_3$ | 185.3 | — | — |
| Comparative Example 18 | α-Fe$_2$O$_3$ | 800.0 | BaCO$_3$ | 190.3 | Bi$_2$O$_3$ | 5.7 |
| Comparative Example 19 | α-Fe$_2$O$_3$ | 800.0 | BaCO$_3$ | 190.5 | Bi$_2$O$_3$ | 5.7 |

Production of plate-like ferrite particles with magnetoplumbite structure for magnetic cards

| Examples and Comparative Examples | Zn compound Kind | Amount (g) | Nb compound Kind | Amount (g) | Ta compound Kind | Amount (g) |
|---|---|---|---|---|---|---|
| Comparative Example 12 | ZnO | 33.2 | — | — | — | — |
| Comparative Example 13 | ZnO | 44.8 | — | — | Ta$_2$O$_5$ | 46.5 |
| Comparative Example 14 | ZnO | 45.6 | — | — | Ta$_2$O$_5$ | 47.4 |
| Comparative Example 15 | ZnO | 32.6 | — | — | — | — |
| Comparative Example 16 | Zno | 44.7 | — | — | Ta$_2$O$_5$ | 46.5 |
| Comparative Example 17 | — | — | — | — | — | — |
| Comparative Example 18 | ZnO | 84.5 | — | — | — | — |
| Comparative Example 19 | — | — | — | — | — | — |

Production of plate-like ferrite particles with magnetoplumbite structure for magnetic cards

| Examples and Comparative Examples | Sn compound Kind | Amount (g) | Ti compound Kind | Amount (g) | Co compound Kind | Amount (g) |
|---|---|---|---|---|---|---|
| Comparative Example 12 | SnO$_2$ | 72.0 | — | — | — | — |
| Comparative Example 13 | — | — | — | — | — | — |
| Comparative Example 14 | — | — | — | — | — | — |
| Comparative Example 15 | SnO$_2$ | 70.8 | — | — | — | — |
| Comparative Example 16 | — | — | — | — | — | — |
| Comparative Example 17 | — | — | TiO$_2$ | 60.3 | CoCO$_3$ | 90.2 |
| Comparative Example 18 | — | — | TiO$_2$ | 83.5 | — | — |
| Comparative Example 19 | SnO$_2$ | 86.4 | — | — | CoCO$_3$ | 62.5 |

TABLE 5

| Examples and Comparative Examples | Flux Kind | Flux Amount (g) | Flux/Fe$_2$O$_3$ (wt %) | Heat-treatment Temperature (° C.) | Heat-treatment Time (hr) |
|---|---|---|---|---|---|
| Example 1 | — | — | — | 1050 | 2 |
| Example 3 | BaCl$_2$.2H$_2$O | 40.0 | 5 | 1020 | 2 |
| Example 4 | BaCl$_2$.2H$_2$O | 40.0 | 5 | 1020 | 2 |
| Example 5 | BaCl$_2$.2H$_2$O | 40.0 | 5 | 1020 | 2 |
| Example 6 | BaCl$_2$.2H$_2$O | 40.0 | 5 | 1020 | 2 |
| Example 7 | BaCl$_2$.2H$_2$O | 40.0 | 5 | 1020 | 2 |
| Example 8 | — | — | — | 1050 | 2 |
| Example 9 | SrCl$_2$.2H$_2$O | 40.0 | 5 | 1020 | 2 |
| Example 10 | BaCl$_2$.2H$_2$O / SrCl$_2$.2H$_2$O | 22.0 / 18.0 | 5 | 1020 | 2 |
| Example 11 | BaCl$_2$.2H$_2$O | 40.0 | 5 | 1020 | 2 |
| Example 12 | BaCl$_2$.2H$_2$O | 40.0 | 5 | 1020 | 2 |
| Example 13 | BaCl$_2$.2H$_2$O | 40.0 | 5 | 1020 | 2 |
| Example 14 | BaCl$_2$.2H$_2$O | 40.0 | 5 | 1020 | 2 |
| Example 15 | BaCl$_2$.2H$_2$O | 40.0 | 5 | 1020 | 2 |

Properties of plate-like ferrite particles with magnetoplumbite structure

| Examples and Comparative Examples | Composition AO · n{(Fe$_{1-(a+b)}$Bi$_a$M$_b$)$_2$O$_3$} | b/a (M = Zn + Nb, Zn + Sn, Zn + Ta) | Plate surface diameter (μm) | Thickness (μM) |
|---|---|---|---|---|
| Example 1 | BaO · 5.76{(Fe$_{0.9031}$Bi$_{0.0021}$Zn$_{0.0632}$Nb$_{0.0316}$)$_2$O$_3$} | 45.1 | 0.76 | 0.20 |
| Example 3 | BaO · 5.89{(Fe$_{0.9033}$Bi$_{0.0019}$Zn$_{0.0632}$Nb$_{0.0316}$)$_2$O$_3$} | 49.8 | 1.50 | 0.50 |
| Example 4 | BaO · 5.76{(Fe$_{0.9031}$Bi$_{0.0021}$Zn$_{0.0632}$Nb$_{0.0316}$)$_2$O$_3$} | 45.1 | 0.60 | 0.16 |
| Example 5 | BaO · 5.99{(Fe$_{0.9006}$Bi$_{0.0046}$Zn$_{0.0632}$Nb$_{0.0316}$)$_2$O$_3$} | 20.4 | 0.35 | 0.05 |
| Example 6 | BaO · 6.03{(Fe$_{0.9097}$Bi$_{0.0021}$Zn$_{0.0588}$Nb$_{0.0294}$)$_2$O$_3$} | 42.0 | 0.78 | 0.20 |
| Example 7 | BaO · 6.06{(Fe$_{0.8944}$Bi$_{0.0021}$Zn$_{0.0690}$Nb$_{0.0345}$)$_2$O$_3$} | 46.6 | 0.81 | 0.18 |
| Example 8 | BaO · 5.78{(Fe$_{0.9031}$Bi$_{0.0021}$Zn$_{0.0632}$Nb$_{0.0316}$)$_2$O$_3$} | 45.1 | 0.76 | 0.22 |
| Example 9 | SrO · 5.80{(Fe$_{0.9031}$Bi$_{0.0021}$Zn$_{0.0632}$Nb$_{0.0316}$)$_2$O$_3$} | 45.1 | 0.78 | 0.25 |
| Example 10 | (0.55Ba · 0.45Sr)O · 5.82{(Fe$_{0.9031}$Bi$_{0.0021}$Zn$_{0.0632}$Nb$_{0.0316}$)$_2$O$_3$} | 45.1 | 0.80 | 0.26 |
| Example 11 | BaO · 5.55{(Fe$_{0.9031}$Bi$_{0.0021}$Zn$_{0.0632}$Nb$_{0.0316}$)$_2$O$_3$} | 45.1 | 0.82 | 0.22 |
| Example 12 | BaO · 5.69{(Fe$_{0.9245}$Bi$_{0.0015}$Zn$_{0.0370}$Sn$_{0.0370}$)$_2$O$_3$} | 49.3 | 1.44 | 0.48 |
| Example 13 | BaO · 5.86{(Fe$_{0.9238}$Bi$_{0.0022}$Zn$_{0.0370}$Sn$_{0.0370}$)$_2$O$_3$} | 33.6 | 0.70 | 0.18 |
| Example 14 | BaO · 5.82{(Fe$_{0.9223}$Bi$_{0.0037}$Zn$_{0.0370}$Sn$_{0.0370}$)$_2$O$_3$} | 20.0 | 0.55 | 0.08 |
| Example 15 | BaO · 6.01{(Fe$_{0.9278}$Bi$_{0.0022}$Zn$_{0.0350}$Sn$_{0.0350}$)$_2$O$_3$} | 31.8 | 0.82 | 0.20 |

Properties of plate-like ferrite particles with magnetoplumbite structure

| Examples and Comparative Examples | Plate ratio | Coercive force (Oe) | Saturation magnetization (emu/g) | S.F.D. | Temperature stability* (Oe/° C.) |
|---|---|---|---|---|---|
| Example 1 | 3.8:1 | 954 | 59.1 | 1.08 | +0.2 |
| Example 3 | 3.0:1 | 900 | 58.1 | 1.12 | +0.8 |
| Example 4 | 3.8:1 | 946 | 59.2 | 1.05 | +0.2 |
| Example 5 | 7.0:1 | 912 | 58.4 | 1.16 | +0.7 |
| Example 6 | 3.9:1 | 1205 | 58.0 | 1.01 | +0.9 |
| Example 7 | 4.5:1 | 340 | 56.9 | 1.28 | +0.3 |
| Example 8 | 3.5:1 | 899 | 58.6 | 1.22 | +0.4 |
| Example 9 | 3.1:1 | 920 | 58.4 | 1.20 | +0.6 |
| Example 10 | 3.1:1 | 905 | 58.1 | 1.09 | +0.4 |
| Example 11 | 3.7:1 | 916 | 58.0 | 1.15 | +0.5 |

TABLE 5-continued

| | | | | | |
|---|---|---|---|---|---|
| Example 12 | 3.0:1 | 888 | 58.9 | 1.12 | +0.7 |
| Example 13 | 3.8:1 | 895 | 58.1 | 1.17 | +0.1 |
| Example 14 | 6.9:1 | 909 | 58.4 | 1.19 | +0.5 |
| Example 15 | 4.1:1 | 1188 | 59.1 | 1.22 | +0.8 |

*Change of coercive force with temperature.

TABLE 6

| Examples and Comparative Examples | Heat-treatment | | | |
|---|---|---|---|---|
| | Flux | | Heat-treatment | |
| | Kind | Amount (g) | Flux/$Fe_2O_2$ (wt %) | Temperature (° C.) | Time (hr) |

| Examples and Comparative Examples | Kind | Amount (g) | Flux/$Fe_2O_2$ (wt %) | Temperature (° C.) | Time (hr) |
|---|---|---|---|---|---|
| Example 16 | $BaCl_2 \cdot 2H_2O$ | 40.0 | 5 | 1020 | 2 |
| Example 17 | — | — | — | 1040 | 2 |
| Example 18 | $SrCl_2 \cdot 2H_2O$ | 40.0 | 5 | 1020 | 2 |
| Example 19 | $BaCl_2 \cdot 2H_2O$ | 22.0 | 5 | 1020 | 2 |
| | $SrCl_2 \cdot 2H_2O$ | 18.0 | | | |
| Example 20 | $BaCl_2 \cdot 2H_2O$ | 40.0 | 5 | 1020 | 2 |
| Example 21 | $BaCl_2 \cdot 2H_2O$ | 40.0 | 5 | 1020 | 2 |
| Example 22 | $BaCl_2 \cdot 2H_2O$ | 40.0 | 5 | 1020 | 2 |
| Example 23 | $BaCl_2 \cdot 2H_2O$ | 40.0 | 5 | 1020 | |
| Example 24 | $BaCl_2 \cdot 2H_2O$ | 40.0 | 5 | 1020 | 2 |
| Example 25 | $BaCl_2 \cdot 2H_2O$ | 40.0 | 5 | 1020 | 2 |
| Example 26 | — | — | — | 1050 | 2 |
| Example 27 | $SrCl_2 \cdot 2H_2O$ | 40.0 | 5 | 1020 | 2 |
| Example 28 | $BaCl_2 \cdot 2H_2O$ | 22.0 | 5 | 1020 | 2 |
| | $SrCl_2 \cdot 2H_2O$ | 18.0 | | | |

Properties of plate-like ferrite particles with magnetoplumbite structure

| Examples and Comparative Examples | Composition $AO \cdot n\{(Fe_{1-(a+b)}Bi_aM_b)_2O_3\}$ | b/a (M = Zn + Nb, Zn + Sn, Zn + Ta) | Plate surface diameter (µm) | Thickness (µm) |
|---|---|---|---|---|
| Example 16 | $BaO \cdot 5.85\{(Fe_{0.9106}Bi_{0.0022}Zn_{0.0436}Sn_{0.0436})_2O_3\}$ | 39.6 | 0.77 | 0.22 |
| Example 17 | $BaO \cdot 5.82\{(Fe_{0.9238}Bi_{0.0022}Zn_{0.0370}Sn_{0.0370})_2O_3\}$ | 33.6 | 0.75 | 0.22 |
| Example 18 | $SrO \cdot 5.80\{(Fe_{0.9238}Bi_{0.0022}Zn_{0.0370}Sn_{0.0370})_2O_3\}$ | 33.6 | 0.74 | 0.19 |
| Example 19 | $(0.55Ba \cdot 0.45Sr)O \cdot 5.82\{(Fe_{0.9238}Bi_{0.0022}Zn_{0.0370}Sn_{0.0370})_2O_3\}$ | 33.6 | 0.80 | 0.22 |
| Example 20 | $BaO \cdot 5.51\{(Fe_{0.9238}Bi_{0.0022}Zn_{0.0370}Sn_{0.0370})_2O_3\}$ | 33.6 | 0.75 | 0.20 |
| Example 21 | $BaO \cdot 5.88\{(Fe_{0.9224}Bi_{0.0016}Zn_{0.0507}Ta_{0.0253})_2O_3\}$ | 47.5 | 1.46 | 0.47 |
| Example 22 | $BaO \cdot 5.99\{(Fe_{0.9218}Bi_{0.0022}Zn_{0.0507}Ta_{0.0253})_2O_3\}$ | 34.5 | 0.75 | 0.23 |
| Example 23 | $BaO \cdot 6.01\{(Fe_{0.9207}Bi_{0.0033}Zn_{0.0507}Ta_{0.0253})_2O_3\}$ | 23.0 | 0.54 | 0.08 |
| Example 24 | $BaO \cdot 6.01\{(Fe_{0.9318}Bi_{0.0022}Zn_{0.0440}Ta_{0.0220})_2O_3\}$ | 30.0 | 0.72 | 0.18 |
| Example 25 | $BaO \cdot 6.01\{(Fe_{0.9004}Bi_{0.0021}Zn_{0.0650}Ta_{0.0325})_2O_3\}$ | 46.4 | 0.92 | 0.18 |
| Example 26 | $BaO \cdot 5.82\{(Fe_{0.9218}Bi_{0.0022}Zn_{0.0507}Ta_{0.0253})_2O_3\}$ | 34.5 | 0.80 | 0.26 |
| Example 27 | $SrO \cdot 5.80\{(Fe_{0.9218}Bi_{0.0022}Zn_{0.0507}Ta_{0.0253})_2O_3\}$ | 34.5 | 0.82 | 0.22 |
| Example 28 | $(0.55Ba \cdot 0.45Sr)O \cdot 5.82\{(Fe_{0.9218}Bi_{0.0022}Zn_{0.0507}Nb_{0.0253})_2O_3\}$ | 34.5 | 0.78 | 0.23 |

| Examples and Comparative Examples | Properties of plate-like ferrite particles with magnetoplumbite structure | | | |
|---|---|---|---|---|
| | Plate ratio | Coercive force (Oe) | Saturation magnetization (emu/g) | S.F.D. | Temperature stability* (Oe/° C.) |

TABLE 6-continued

| | | | | | |
|---|---|---|---|---|---|
| Example 16 | 3.5:1 | 370 | 56.4 | 1.25 | +0.9 |
| Example 17 | 3.4:1 | 916 | 58.7 | 1.13 | +0.6 |
| Example 18 | 3.9:1 | 933 | 58.8 | 1.18 | +0.5 |
| Example 19 | 3.6:1 | 900 | 58.1 | 1.14 | +0.8 |
| Example 20 | 3.8:1 | 954 | 59.1 | 1.10 | +0.4 |
| Example 21 | 3.1:1 | 912 | 58.4 | 1.09 | +0.9 |
| Example 22 | 3.2:1 | 977 | 58.0 | 1.11 | +0.7 |
| Example 23 | 6.7:1 | 899 | 59.3 | 1.20 | +0.2 |
| Example 24 | 4.0:1 | 1200 | 58.6 | 1.00 | +0.9 |
| Example 25 | 5.0:1 | 385 | 56.7 | 1.27 | +0.1 |
| Example 26 | 3.1:1 | 805 | 58.1 | 1.19 | +0.5 |
| Example 27 | 3.7:1 | 1012 | 58.0 | 1.02 | +0.8 |
| Example 28 | 3.4:1 | 999 | 58.9 | 1.18 | +0.7 |

*Change of coercive force with temperature.

TABLE 7

| Examples and Comparative Examples | Heat-treatment | | | |
|---|---|---|---|---|
| | Flux | | Heat-treatment | |
| | Kind | Amount (g) | Flux/$Fe_2O_3$ (wt %) | Temperature (° C.) | Time (hr) |

| Examples and Comparative Examples | Kind | Amount (g) | Flux/$Fe_2O_3$ (wt %) | Temperature (° C.) | Time (hr) |
|---|---|---|---|---|---|
| Example 29 | $BaCl_2 \cdot 2H_2O$ | 40.0 | 5 | 1020 | 2 |
| Comparative Example 1 | $BaCl_2 \cdot 2H_2O$ | 40.0 | 5 | 1020 | 2 |
| Comparative Example 2 | $BaCl_2 \cdot 2H_2O$ | 40.0 | 5 | 1020 | 2 |
| Comparative Example 3 | $BaCl_2 \cdot 2H_2O$ | 40.0 | 5 | 1040 | 2 |
| Comparative Example 4 | $SrCl_2 \cdot 2H_2O$ | 40.0 | 5 | 1020 | 2 |
| Comparative Example 5 | $BaCl_2 \cdot 2H_2O$ | 40.0 | 5 | 1020 | 2 |
| Comparative Example 6 | $BaCl_2 \cdot 2H_2O$ | 40.0 | 5 | 1020 | 2 |
| Comparative Example 7 | $BaCl_2 \cdot 2H_2O$ | 40.0 | 5 | 1020 | 2 |
| Comparative Example 8 | $BaCl_2 \cdot 2H_2O$ | 40.0 | 5 | 1020 | 2 |
| Comparative Example 9 | $BaCl_2 \cdot 2H_2O$ | 40.0 | 5 | 1020 | 2 |
| Comparative Example 10 | $BaCl_2 \cdot 2H_2O$ | 40.0 | 5 | 1020 | 2 |
| Comparative Example 11 | $BaCl_2 \cdot 2H_2O$ | 40.0 | 5 | 1020 | 2 |

Properties of plate-like ferrite particles with magnetoplumbite structure

| Examples and Comparative Examples | Composition $AO \cdot n\{(Fe_{1-(a+b)}Bi_aM_b)_2O_3\}$ | b/a (M = Zn + Nb, Zn + Sn, Zn + Ta) | Plate surface diameter (µm) | Thickness (µm) |
|---|---|---|---|---|
| Example 29 | $BaO \cdot 5.52\{(Fe_{0.9218}Bi_{0.0022}Zn_{0.0507}Ta_{0.0253})_2O_3\}$ | 34.5 | 0.70 | 0.18 |
| Comparative Example 1 | $BaO \cdot 5.93\{(Fe_{0.9038}Bi_{0.0014}Zn_{0.0632}Nb_{0.0316})_2O_3\}$ | 67.7 | 1.32 | 0.60 |
| Comparative Example 2 | $BaO \cdot 5.74\{(Fe_{0.8906}Bi_{0.0146}Zn_{0.0632}Nb_{0.0316})_2O_3\}$ | 6.5 | 0.76 | 0.03 |
| Comparative Example 3 | $BaO \cdot 5.74\{(Fe_{0.9052}Zn_{0.0632}Nb_{0.0316})_2O_3\}$ | — | 1.75 | 0.62 |
| Comparative Example 4 | $SrO \cdot 5.74\{(Fe_{0.9400}Bi_{0.0600})_2O_3\}$ | — | 0.51 | 0.08 |
| Comparative Example 5 | $BaO \cdot 6.54\{(Fe_{0.9031}Bi_{0.0021}Zn_{0.0632}Nb_{0.0316})_2O_3\}$ | 45.1 | 0.77 | 0.21 |
| Comparative | $BaO \cdot 5.04\{(Fe_{0.9031}Bi_{0.0021}Zn_{0.0632}Nb_{0.0316})_2O_3\}$ | 45.1 | 0.76 | 0.20 |

TABLE 7-continued

| | | | | |
|---|---|---|---|---|
| Example 6 Comparative Example 7 | BaO · 5.74{(Fe$_{0.8952}$Bi$_{0.0100}$Zn$_{0.0632}$Nb$_{0.0316}$)$_2$O$_3$} | 9.5 | 0.56 | 0.05 |
| Comparative Example 8 | BaO · 5.74{(Fe$_{0.9047}$Bi$_{0.0005}$Zn$_{0.0632}$Nb$_{0.0316}$)$_2$O$_3$} | 189.6 | 1.78 | 0.70 |
| Comparative Example 9 | BaO · 5.74{(Fe$_{0.8581}$Bi$_{0.0021}$Zn$_{0.0932}$Nb$_{0.0466}$)$_2$O$_3$} | 66.6 | 0.81 | 0.18 |
| Comparative Example 10 | BaO · 5.74{(Fe$_{0.9679}$Bi$_{0.0021}$Zn$_{0.0200}$Nb$_{0.0100}$)$_2$O$_3$} | 14.3 | 0.76 | 0.22 |
| Comparative Example 11 | BaO · 6.05{(Fe$_{0.9248}$Bi$_{0.0012}$Zn$_{0.0370}$Sn$_{0.0370}$)$_2$O$_3$} | 61.7 | 1.30 | 0.65 |

Properties of plate-like ferrite particles with magnetoplumbite structure

| Examples and Comparative Examples | Plate ratio | Coercive force (Oe) | Saturation magnetization (emu/g) | S.F.D. | Temperature stability* (Oe/° C.) |
|---|---|---|---|---|---|
| Example 29 | 3.8:1 | 895 | 58.1 | 1.15 | +0.4 |
| Comparative Example 1 | 2.2:1 | 870 | 58.1 | 1.42 | +2.8 |
| Comparative Example 2 | 26.7:1 | 853 | 57.5 | 1.47 | +2.9 |
| Comparative Example 3 | 2.8:1 | 916 | 58.1 | 1.40 | +2.3 |
| Comparative Example 4 | 6.4:1 | 2733 | 52.2 | 1.28 | +3.5 |
| Comparative Example 5 | 3.7:1 | 921 | 55.1 | 1.37 | +2.8 |
| Comparative Example 6 | 3.8:1 | 954 | 55.3 | 1.48 | +3.2 |
| Comparative Example 7 | 11.2:1 | 912 | 55.0 | 1.36 | +2.7 |
| Comparative Example 8 | 2.5:1 | 905 | 58.0 | 1.31 | +1.9 |
| Comparative Example 9 | 4.5:1 | 240 | 52.3 | 1.72 | +1.3 |
| Comparative Example 10 | 3.5:1 | 2819 | 58.0 | 1.22 | +4.4 |
| Comparative Example 11 | 2.0:1 | 888 | 58.5 | 1.37 | +3.6 |

*Change of coercive force with temperature.

TABLE 8

| Examples and Comparative Examples | Flux Kind | Flux Amount (g) | Flux/Fe$_2$O$_3$ (wt %) | Heat-treatment Temperature (° C.) | Heat-treatment Time (hr) |
|---|---|---|---|---|---|
| Comparative Example 12 | BaCl$_2$·2H$_2$O | 40.0 | 5 | 1020 | 2 |
| Comparative Example 13 | BaCl$_2$·2H$_2$O | 40.0 | 5 | 1020 | 2 |
| Comparative Example 14 | BaCl$_2$·2H$_2$O | 40.0 | 5 | 1020 | 2 |
| Comparative Example 15 | BaCl$_2$·2H$_2$O | 40.0 | 5 | 1040 | 2 |
| Comparative Example 16 | BaCl$_2$·2H$_2$O | 40.0 | 5 | 1020 | 2 |
| Comparative Example 17 | BaCl$_2$·2H$_2$O | 40.0 | 5 | 1020 | 2 |
| Comparative Example 18 | BaCl$_2$·2H$_2$O | 40.0 | 5 | 1020 | 2 |
| Comparative Example 19 | BaCl$_2$·2H$_2$O | 40.0 | 5 | 1020 | 2 |

Properties of plate-like ferrite particles with magnetoplumbite structure

| Examples and Comparative Examples | Composition AO · n{(Fe$_{1-(a+b)}$Bi$_a$M$_b$)$_2$O$_3$} | b/a (M = Zn + Nb, Zn + Sn, Zn + Ta) | Plate surface diameter (μM) | Thickness (μm) |
|---|---|---|---|---|
| Comparative Example 12 | BaO · 6.01{(Fe$_{0.9106}$Bi$_{0.0154}$Zn$_{0.0370}$Sn$_{0.0370}$)$_2$O$_3$} | 4.8 | 0.78 | 0.04 |
| Comparative Example 13 | BaO · 5.96{(Fe$_{0.9228}$Bi$_{0.0012}$Zn$_{0.0507}$Ta$_{0.0253}$)$_2$O$_3$} | 63.3 | 1.78 | 0.71 |
| Comparative Example 14 | BaO · 5.88{(Fe$_{0.9055}$Bi$_{0.0185}$Zn$_{0.0507}$Ta$_{0.0253}$)$_2$O$_3$} | 4.1 | 0.75 | 0.05 |
| Comparative Example 15 | BaO · 5.86{(Fe$_{0.9260}$Zn$_{0.0370}$Sn$_{0.0370}$)$_2$O$_3$} | — | 0.70 | 0.18 |
| Comparative Example 16 | BaO · 5.82{(Fe$_{0.9240}$Zn$_{0.0507}$Ta$_{0.0253}$)$_2$O$_3$} | 20.0 | 0.55 | 0.08 |
| Comparative Example 17 | BaO · 6.01{(Fe$_{0.8700}$Co$_{0.0650}$Ti$_{0.0650}$)$_2$O$_3$} | — | 0.82 | 0.20 |
| Comparative Example 18 | BaO · 5.99{(Fe$_{0.8187}$Bi$_{0.0022}$Zn$_{0.0900}$Ti$_{0.0900}$)$_2$O$_3$} | 81.8 | 0.77 | 0.22 |
| Comparative Example 19 | BaO · 6.00{(Fe$_{0.9078}$Bi$_{0.0022}$Co$_{0.0450}$Sn$_{0.0450}$)$_2$O$_3$} | 40.9 | 0.75 | 0.22 |

Properties of plate-like ferrite particles with magnetoplumbite structure

| Examples and Comparative Examples | Plate ratio | Coercive force (Oe) | Saturation magnetization (emu/g) | S.F.D. | Temperature stability* (Oe/° C.) |
|---|---|---|---|---|---|
| Comparative Example 12 | 19.5:1 | 931 | 58.0 | 1.39 | +2.4 |
| Comparative Example 13 | 2.5:1 | 916 | 58.3 | 1.45 | +2.5 |
| Comparative Example 14 | 15.0:1 | 853 | 58.1 | 1.42 | +2.7 |
| Comparative Example 15 | 3.8:1 | 895 | 58.1 | 1.47 | +2.1 |
| Comparative Example 16 | 6.9:1 | 909 | 58.4 | 1.49 | +2.5 |
| Comparative Example 17 | 4.1:1 | 897 | 58.1 | 1.42 | +4.8 |
| Comparative Example 18 | 3.5:1 | 928 | 51.3 | 1.41 | +1.9 |
| Comparative Example 19 | 3.4:1 | 916 | 58.2 | 1.33 | +1.6 |

*Change of coercive force with temperature.

Examples 30 to 56 and Comparative Examples 20 to 38

<Production of Magnetic Tape>

The same procedure as defined in Example 2 was conducted except that the plate-like ferrite particles with magnetoplumbite structure obtained in Examples 3 to 29 and Comparative Examples 1 to 19, were used respectively, thereby producing magnetic tapes.

Various properties of the obtained magnetic tapes are shown in Tables 9 to 12.

TABLE 9

| Examples and Comparative Examples | Plate-like ferrite particles with magneto-plumbite structure | Properties of magnetic tape | | |
|---|---|---|---|---|
| | | Coercive force (Oe) | Saturation magnetic flux density (Gauss) | Residual magnetic flux density (Gauss) |
| Example 2 | Example 1 | 960 | 1108 | 1025 |
| Example 30 | Example 3 | 915 | 1020 | 940 |
| Example 31 | Example 4 | 952 | 1116 | 1035 |
| Example 32 | Example 5 | 915 | 1054 | 970 |
| Example 33 | Example 6 | 1222 | 1018 | 939 |
| Example 34 | Example 7 | 350 | 1004 | 931 |
| Example 35 | Example 8 | 909 | 1088 | 1003 |
| Example 36 | Example 9 | 934 | 1063 | 978 |
| Example 37 | Example 10 | 911 | 1033 | 951 |
| Example 38 | Example 11 | 933 | 1024 | 946 |
| Example 39 | Example 12 | 900 | 1088 | 1003 |
| Example 40 | Example 13 | 903 | 1021 | 950 |
| Example 41 | Example 14 | 924 | 1066 | 986 |
| Example 42 | Example 15 | 1211 | 1111 | 1035 |

| Examples and Comparative Examples | Properties of magnetic tape | | | |
|---|---|---|---|---|
| | Squareness | S.F.D. | Gloss (%) | Temperature stability* (Oe/° C.) |
| Example 2 | 0.925 | 0.05 | 95 | +0.3 |
| Example 30 | 0.922 | 0.06 | 94 | +0.9 |
| Example 31 | 0.927 | 0.04 | 92 | +0.3 |
| Example 32 | 0.920 | 0.05 | 92 | +0.6 |
| Example 33 | 0.922 | 0.03 | 95 | +0.8 |
| Example 34 | 0.927 | 0.10 | 93 | +0.4 |
| Example 35 | 0.922 | 0.06 | 91 | +0.6 |
| Example 36 | 0.920 | 0.05 | 93 | +0.8 |
| Example 37 | 0.921 | 0.07 | 95 | +0.6 |
| Example 38 | 0.924 | 0.05 | 91 | +0.5 |
| Example 39 | 0.922 | 0.06 | 97 | +0.7 |
| Example 40 | 0.930 | 0.06 | 94 | +0.3 |
| Example 41 | 0.925 | 0.07 | 96 | +0.5 |
| Example 42 | 0.932 | 0.04 | 91 | +0.7 |

*Change of coercive force with temperature.

TABLE 10

| Examples and Comparative Examples | Plate-like ferrite particles with magneto-plumbite structure | Properties of magnetic tape | | |
|---|---|---|---|---|
| | | Coercive force (Oe) | Saturation magnetic flux density (Gauss) | Residual magnetic flux density (Gauss) |
| Example 43 | Example 16 | 390 | 970 | 894 |
| Example 44 | Example 17 | 933 | 1090 | 1012 |
| Example 45 | Example 18 | 955 | 1099 | 1012 |
| Example 46 | Example 19 | 915 | 1016 | 936 |
| Example 47 | Example 20 | 966 | 1117 | 1031 |
| Example 48 | Example 21 | 918 | 1044 | 967 |
| Example 49 | Example 22 | 1000 | 1009 | 937 |
| Example 50 | Example 23 | 919 | 1130 | 1045 |
| Example 51 | Example 24 | 1207 | 1075 | 991 |
| Example 52 | Example 25 | 397 | 975 | 907 |
| Example 53 | Example 26 | 823 | 1027 | 949 |
| Example 54 | Example 27 | 1007 | 1007 | 940 |
| Example 55 | Example 28 | 1012 | 1108 | 1028 |

| Examples and Comparative Examples | Properties of magnetic tape | | | |
|---|---|---|---|---|
| | Squareness | S.F.D. | Gloss (%) | Temperature stability* (Oe/° C.) |
| Example 43 | 0.922 | 0.10 | 92 | +0.9 |
| Example 44 | 0.928 | 0.08 | 96 | +0.7 |
| Example 45 | 0.921 | 0.07 | 91 | +0.6 |
| Example 46 | 0.921 | 0.06 | 94 | +0.7 |
| Example 47 | 0.923 | 0.05 | 95 | +0.5 |
| Example 48 | 0.926 | 0.05 | 92 | +0.7 |
| Example 49 | 0.929 | 0.04 | 90 | +0.8 |
| Example 50 | 0.925 | 0.07 | 94 | +0.4 |
| Example 51 | 0.922 | 0.03 | 93 | +0.9 |
| Example 52 | 0.930 | 0.09 | 92 | +0.4 |
| Example 53 | 0.924 | 0.07 | 95 | +0.4 |
| Example 54 | 0.933 | 0.05 | 96 | +0.7 |
| Example 55 | 0.928 | 0.06 | 91 | +0.8 |

*Change of coercive force with temperature.

TABLE 11

| Examples and Comparative Examples | Plate-like ferrite particles with magneto-plumbite structure | Properties of magnetic tape | | |
|---|---|---|---|---|
| | | Coercive force (Oe) | Saturation magnetic flux density (Gauss) | Residual magnetic flux density (Gauss) |
| Example 56 | Example 29 | 918 | 1038 | 960 |
| Comparative Example 20 | Comparative Example 1 | 887 | 1011 | 770 |
| Comparative Example 21 | Comparative Example 2 | 853 | 1001 | 806 |
| Comparative Example 22 | Comparative Example 3 | 933 | 1015 | 789 |
| Comparative Example 23 | Comparative Example 4 | 2751 | 908 | 686 |
| Comparative Example 24 | Comparative Example 5 | 935 | 944 | 745 |
| Comparative Example 25 | Comparative Example 6 | 960 | 950 | 748 |
| Comparative Example 26 | Comparative Example 7 | 915 | 939 | 753 |
| Comparative Example 27 | Comparative Example 8 | 922 | 1018 | 826 |
| Comparative Example 28 | Comparative Example 9 | 243 | 912 | 699 |
| Comparative Example 29 | Comparative Example 10 | 2829 | 1028 | 822 |
| Comparative Example 30 | Comparative Example 11 | 901 | 1063 | 849 |

| Examples and Comparative Examples | Properties of magnetic tape | | | |
|---|---|---|---|---|
| | Squareness | S.F.D. | Gloss (%) | Temperature stability* (Oe/° C.) |
| Example 56 | 0.925 | 0.06 | 93 | +0.6 |
| Comparative Example 20 | 0.762 | 0.46 | 70 | +2.7 |
| Comparative Example 21 | 0.805 | 0.44 | 62 | +3.0 |
| Comparative Example 22 | 0.777 | 0.48 | 66 | +2.5 |
| Comparative Example 23 | 0.756 | 0.47 | 61 | +3.6 |
| Comparative Example 24 | 0.789 | 0.46 | 64 | +2.9 |
| Comparative Example 25 | 0.787 | 0.45 | 55 | +3.3 |

TABLE 11-continued

| | | | | |
|---|---|---|---|---|
| Comparative Example 26 | 0.802 | 0.43 | 62 | +2.5 |
| Comparative Example 27 | 0.811 | 0.33 | 55 | +2.2 |
| Comparative Example 28 | 0.766 | 0.64 | 63 | +1.6 |
| Comparative Example 29 | 0.800 | 0.56 | 61 | +4.4 |
| Comparative Example 30 | 0.799 | 0.55 | 53 | +3.7 |

*Change of coercive force with temperature.

TABLE 12

| | | Properties of magnetic tape | | |
|---|---|---|---|---|
| Examples and Comparative Examples | Plate-like ferrite particles with magneto-plumbite structure | Coercive force (Oe) | Saturation magnetic flux density (Gauss) | Residual magnetic flux density (Gauss) |
| Comparative Example 31 | Comparative Example 12 | 945 | 1023 | 806 |
| Comparative Example 32 | Comparative Example 13 | 922 | 1024 | 823 |
| Comparative Example 33 | Comparative Example 14 | 869 | 1008 | 771 |
| Comparative Example 34 | Comparative Example 15 | 903 | 1021 | 950 |
| Comparative Example 35 | Comparative Example 16 | 924 | 1066 | 986 |
| Comparative Example 36 | Comparative Example 17 | 902 | 1011 | 811 |
| Comparative Example 37 | Comparative Example 18 | 931 | 900 | 740 |
| Comparative Example 38 | Comparative Example 19 | 933 | 1090 | 903 |

| Examples and Comparative Examples | Properties of magnetic tape | | | |
|---|---|---|---|---|
| | Squareness | S.F.D. | Gloss (%) | Temperature stability* (Oe/° C.) |
| Comparative Example 31 | 0.788 | 0.47 | 55 | +2.8 |
| Comparative Example 32 | 0.804 | 0.45 | 61 | +2.6 |
| Comparative Example 33 | 0.765 | 0.56 | 57 | +2.8 |
| Comparative Example 34 | 0.930 | 0.46 | 54 | +2.3 |
| Comparative Example 35 | 0.925 | 0.47 | 66 | +2.4 |
| Comparative Example 36 | 0.802 | 0.55 | 61 | +4.7 |
| Comparative Example 37 | 0.822 | 0.54 | 52 | +2.2 |
| Comparative Example 38 | 0.828 | 0.38 | 66 | +1.8 |

*Change of coercive force with temperature.

Example 57

5.0 kg of the plate-like barium ferrite particles with magnetoplumbite structure as obtained in Example 4, having a composition of BaO·5.76{$(Fe_{0.9031}Bi_{0.0021}Zn_{0.0632}Nb_{0.0316})_2O_3$} (average plate surface diameter: 0.60 μm, average thickness: 0.16 μm, average plate ratio (plate surface diameter/thickness): 3.8, coercive force Hc: 946 Oe, saturation magnetization as: 59.2 emu/g, switching field distribution (S.F.D.): 1.05, temperature stability as to coercive force: +0.2 Oe/° C., apparent density: 0.63 g/cm$^3$, tap density: 1.72 g/cm$^3$, and compaction density: 2.70 g/cm$^3$) were subjected to a dry compaction treatment for 30 minutes using a sand mill (MPUV-2, manufactured by Matsumoto Chuzo Tekkosho Co., Ltd., linear load: 60 kg/cm$^2$), thereby obtaining compacted plate-like barium ferrite particles with magnetoplumbite structure. Properties of the thus obtained compacted particles are shown in Table 13.

Using the obtained compacted ferrite particles, the same procedure as defined in Example 2 was conducted to produce a magnetic tape. With respect to magnetic properties of the thus obtained magnetic tape, the coercive force Hc was 952 Oe, the saturation magnetic flux density Bm was 1,116 Gauss, the residual magnetic flux density Br was 1,035 Gauss, the squareness (Br/Bm) was 0.927, the switching field distribution (S.F.D.) was 0.04, the gloss was 92%, and the temperature stability as to the coercive force was +0.3 Oe/° C.

Example 58

5 liters of a suspension containing the plate-like barium ferrite particles with magnetoplumbite structure as obtained in Example 4 in an amount of 99 g/liter, was heated to 60° C. 155.8 ml of a 1.0N NaAlO$_2$ solution (corresponding to 0.85% by weight (calculated as Al) based on the weight of the plate-like barium ferrite particles with magnetoplumbite structure) was added to the suspension. After the resultant suspension was allowed to stand in this condition for 30 minutes, acetic acid was added thereto to adjust the pH to 7.5. Next, after the suspension was filtrated using Nutsche, the filtrated cake was washed with pure water until the electric conductivity thereof was decreased to not more than 30 μs. Thereafter, the resultant product was dried and pulverized to obtain plate-like barium ferrite particles with magnetoplumbite structure whose surfaces were coated with hydroxide or oxide of aluminum.

Properties of the thus obtained plate-like barium ferrite particles with magnetoplumbite structure whose surfaces were coated with hydroxide or oxide of aluminum (wherein the amount of the hydroxide or oxide of aluminum coated corresponds to 0.85% by weight (calculated as Al) based on the weight of the plate-like barium ferrite particles with magnetoplumbite structure), are shown in Table 13.

Example 59

150 liters of a suspension containing the plate-like barium ferrite particles with magnetoplumbite structure as obtained in Example 4 in a concentration of 8 g/liter, was heated to 60° C. A 0.1N NaOH aqueous solution was added to the suspension to adjust the pH thereof to 9.0. 36.0 g of #3 water glass was gradually added to the obtained alkaline suspension. After completion of the addition, the suspension was aged for 60 minutes. Successively, a 0.1N acetic acid solution was added to the suspension to adjust the pH thereof to 6.0. Next, after the suspension was filtrated using Nutsche, the filtrated cake was washed with pure water until the electric conductivity thereof was decreased to not more than 30 μs. Thereafter, the resultant product was dried and pulverized to obtain plate-like barium ferrite particles with magnetoplumbite structure whose surfaces were coated with hydroxide or oxide of silicon. 5 kg of the thus obtained particles was subjected to a dry compaction treatment for 30 minutes using a sand mill (MPUV-2, manufactured by Matsumoto Chuzo Tekkosho Co., Ltd., linear load: 60 kg/cm$^2$), thereby obtaining compacted and coated plate-like barium ferrite particles with magnetoplumbite structure.

Properties of the thus obtained plate-like barium ferrite particles with magnetoplumbite structure whose surfaces were coated with hydroxide or oxide of silicon (wherein the amount of the hydroxide or oxide of silicon coated corresponds to 0.83% by weight (calculated as $SiO_2$) based on the weight of the plate-like barium ferrite particles with magnetoplumbite structure), are shown in Table 13.

Example 60

50 g of a γ-aminopropyl trimethoxysilane: KBM 903 (tradename, produced by Shin-etsu Chemical Industries Co., Ltd.) as the silane-based coupling agent having a mercapto group was added to 5.0 kg of the plate-like barium ferrite particles with magnetoplumbite structure as obtained in Example 4. The resultant mixture was subjected to a dry compaction treatment for 30 minutes using a sand mill (MPUV-2, manufactured by Matsumoto Chuzo Tekkosho Co., Ltd., linear load: 60 kg/cm²), thereby obtaining compacted and attached plate-like barium ferrite particles with magnetoplumbite structure on surfaces of which γ-aminopropyl trimethoxysilane was attached (In this case, the amount of γ-aminopropyl trimethoxysilane attached, was 0.02% by weight (calculated as C) based on the weight of the plate-like barium ferrite particles with magnetoplumbite structure). Properties of the thus obtained compacted and attached plate-like barium ferrite particles with magnetoplumbite structure, are shown in Table 13.

TABLE 13

| Examples and Comparative Examples | Plate-like ferrite particles with magneto-plumbite structure | Properties of Plate-like ferrite particles with magneto-plumbite structure after compaction treatment or surface treatment | | |
|---|---|---|---|---|
| | | Coercive force (Oe) | Saturation magnetization (emu/g) | S.F.D. |
| Example 57 | Example 4 | 950 | 59.3 | 1.02 |
| Example 58 | Example 4 | 945 | 59.0 | 1.03 |
| Example 59 | Example 4 | 948 | 59.0 | 1.05 |
| Example 60 | Example 4 | 951 | 59.1 | 1.02 |

| Examples and Comparative Examples | Properties of Plate-like ferrite particles with magneto-plumbite structure after compaction treatment and surface treatment | | | |
|---|---|---|---|---|
| | Temperature stability* (Oe/° C.) | Apparent density (g/cm³) | Tap density (g/cm³) | Compaction density (g/cm³) |
| Example 57 | +0.3 | 0.85 | 1.95 | 2.80 |
| Example 58 | +0.2 | 0.65 | 1.70 | 2.69 |
| Example 59 | +0.3 | 0.84 | 1.92 | 2.79 |
| Example 60 | +0.2 | 0.88 | 1.94 | 2.81 |

*Change of coercive force with temperature.

Examples 61 to 64

The same procedure as defined in Example 2 was conducted except that the plate-like ferrite particles with magnetoplumbite structure produced in Examples 57 to 60 were used, thereby obtaining magnetic tapes. The properties of the thus obtained magnetic tapes are shown in Table 14.

TABLE 14

| Examples and Comparative Examples | Properties of magnetic tape | | |
|---|---|---|---|
| | Coercive force (Oe) | Saturation magnetic flux density (Gauss) | Residual magnetic flux density (Gauss) |
| Example 61 | 950 | 1120 | 1049 |
| Example 62 | 954 | 1116 | 1043 |
| Example 63 | 955 | 1122 | 1051 |
| Example 64 | 953 | 1128 | 1060 |

| Examples and Comparative Examples | Properties of magnetic tape | | | |
|---|---|---|---|---|
| | Squareness | S.F.D. | Gloss (%) | Temperature stability* (Oe/° C.) |
| Example 61 | 0.937 | 0.04 | 94 | +0.4 |
| Example 62 | 0.935 | 0.04 | 96 | +0.3 |
| Example 63 | 0.937 | 0.04 | 95 | +0.4 |
| Example 64 | 0.940 | 0.03 | 97 | +0.3 |

*Change of coercive force with temperature.

What is claimed is:

1. Plate-like ferrite particles with magnetoplumbite structure having a composition represented by the general formula of $AO \cdot n\{(Fe_{1-(a+b)}Bi_a M_b)_2 O_3\}$ wherein A is Ba, Sr or Ba—Sr; M is Zn—Nb, Zn—Ta or Zn—Sn; n is from 5.5 to 6.1; a is from 0.001 to 0.005; b is from 0.050 to 0.120; and the ratio of b/a is from 20 to 50.

2. Plate-like ferrite particles with magnetoplumbite structure according to claim 1, which further have an average plate surface diameter of 0.30 to 1.50 μm, an average thickness of 0.05 to 0.60 μm and an average plate ratio (plate surface diameter/thickness) of 3 to 7.

3. Plate-like ferrite particles with magnetoplumbite structure according to claim 1, which further have a coercive force of 300 to 1,400 Oe, a saturation magnetization of not less than 56 emu/g and a switching field distribution of not more than 1.30.

4. Plate-like ferrite particles with magnetoplumbite structure according to claim 1, which further have a temperature stability relative to coercive force of −1.5 to +1.5 Oe/° C.

5. Plate-like ferrite particles with magnetoplumbite structure according to claim 1, which further have an apparent density of 0.70 to 1.00 g/cm³ and a tap density of 1.75 to 2.10 g/cm³.

6. Plate-like ferrite particles with magnetoplumbite structure according to claim 1, which further have on the surface thereof, a coat comprising at least one compound selected from the group consisting of hydroxides of aluminum, oxides of aluminum, hydroxides of silicon and oxides of silicon.

7. Plate-like ferrite particles with magnetoplumbite structure according to claim 6, wherein the amount of said coat is in the range of 0.01 to 2.00% by weight, calculated as Al or $Sio_2$, based on the total weight of the particles.

8. Plate-like ferrite particles with magnetoplumbite structure according to claim 6, which further have an apparent density of 0.70 to 1.00 g/cm³ and a tap density of 1.75 to 2.10 g/cm³.

9. Plate-like ferrite particles with magnetoplumbite structure according to claim 1, which further have on the surface thereof an attached agent comprising at least one treating agent selected from the group consisting of (a) polyester-based high-molecular dispersant having an amino group, (b)

polyester-based high-molecular dispersant having an acid group, (c) silane-based coupling agent having an aminopropyl group, (d) silane-based coupling agent having a mercapto group, and (e) coordinate-type titanium-based coupling agent.

10. Plate-like ferrite particles with magnetoplumbite structure according to claim 9, wherein the amount of said treating agent attached, is in the range of 0.1 to 2.0% by weight based on the total weight of the particles.

11. Plate-like ferrite particles with magnetoplumbite structure according to claim 9, which further have an apparent density of 0.70 to 1.00 g/cm$^3$ and a tap density of 1.75 to 2.10 g/cm$^3$.

* * * * *